US012589508B2

(12) United States Patent
Yamane et al.

(10) Patent No.: US 12,589,508 B2
(45) Date of Patent: Mar. 31, 2026

(54) ROBOT HAND, ROBOT, ROBOT SYSTEM, AND TRANSFER METHOD

(71) Applicant: Kawasaki Jukogyo Kabushiki Kaisha, Kobe (JP)

(72) Inventors: Hideshi Yamane, Kobe (JP); Shoichi Miyao, Kobe (JP); Hirohito Morioka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 1090 days.

(21) Appl. No.: 17/631,894

(22) PCT Filed: Aug. 4, 2020

(86) PCT No.: PCT/JP2020/029835
§ 371 (c)(1),
(2) Date: Feb. 1, 2022

(87) PCT Pub. No.: WO2021/025019
PCT Pub. Date: Feb. 11, 2021

(65) Prior Publication Data
US 2022/0288793 A1 Sep. 15, 2022

(30) Foreign Application Priority Data

Aug. 5, 2019 (JP) ................................ 2019-143711

(51) Int. Cl.
*B25J 15/06* (2006.01)
*B25J 9/16* (2006.01)
(Continued)

(52) U.S. Cl.
CPC ......... *B25J 15/0066* (2013.01); *B25J 9/1612* (2013.01); *B25J 9/1653* (2013.01);
(Continued)

(58) Field of Classification Search
CPC ................ B25J 15/0616; B25J 15/0014; B25J 15/0061; B25J 15/0052; B25J 15/00;
(Continued)

(56) References Cited

U.S. PATENT DOCUMENTS

| | | | |
|---|---|---|---|
| 5,232,332 A | 8/1993 | Focke | |
| 7,950,708 B2 * | 5/2011 | Parnell | ................ B25J 15/0616 294/2 |

(Continued)

FOREIGN PATENT DOCUMENTS

| | | |
|---|---|---|
| CN | 102161438 A | 8/2011 |
| CN | 204700876 U | 10/2015 |

(Continued)

OTHER PUBLICATIONS

Automated Vacuum Grip Device And Method Of Securely Gripping A Component; Patent Number: 112739632; Document ID: CN 112739632 A; Date Published: Apr. 30, 2021; Application No. CN 201980061871 A; Inventor: Secibovic, Kabir; Date Filed: Sep. 16, 2019 (Year: 2021).*

(Continued)

*Primary Examiner* — Mahdi H Nejad
(74) *Attorney, Agent, or Firm* — XSENSUS LLP

(57) ABSTRACT

A robot hand is a robot hand to transfer an article, which includes a holder to move the article in a first direction while holding the article, a driving belt having a transferring surface on which the article is placed and driven to move the transferring surface in the first direction, and a first driver to drive the driving belt. The holder moves in the first direction to place the held article onto the transferring surface.

21 Claims, 30 Drawing Sheets

(51) Int. Cl.
    *B25J 15/00*        (2006.01)
    *B25J 15/02*        (2006.01)

(52) U.S. Cl.
    CPC ......... *B25J 9/1697* (2013.01); *B25J 15/0014*
    (2013.01); *B25J 15/02* (2013.01); *B25J*
    *15/0616* (2013.01)

(58) Field of Classification Search
    CPC ........ B25J 19/023; B25J 9/1612; B25J 13/08;
    B65G 61/00; B65G 47/91
    USPC ........ 901/40; 294/213, 188; 414/688, 744.5,
    414/744.8, 796.6, 797, 815
    See application file for complete search history.

(56)               References Cited

U.S. PATENT DOCUMENTS

| | | | | |
|---|---|---|---|---|
| 9,498,887 | B1 * | 11/2016 | Zevenbergen | ....... B25J 15/0052 |
| 10,226,865 | B2 * | 3/2019 | Nakayama | ............. B25J 9/1669 |
| 2010/0040450 | A1 * | 2/2010 | Parnell | .................. B66C 1/0256 |
| | | | | 414/752.1 |
| 2010/0239408 | A1 * | 9/2010 | Becker | ................. B65G 47/914 |
| | | | | 414/800 |
| 2011/0254298 | A1 * | 10/2011 | Lomerson, Jr. | ...... B25J 15/0616 |
| | | | | 294/188 |
| 2011/0268548 | A1 * | 11/2011 | Doll | ......................... B25J 15/00 |
| | | | | 414/688 |
| 2016/0075035 | A1 | 3/2016 | Sun | |
| 2017/0107058 | A1 | 4/2017 | Nakamoto et al. | |
| 2018/0215540 | A1 | 8/2018 | Tanaka et al. | |
| 2019/0389082 | A1 * | 12/2019 | Higo | ...................... B25J 9/1697 |
| 2020/0001545 | A1 * | 1/2020 | Watanabe | ............ B25J 15/0019 |
| 2023/0002173 | A1 * | 1/2023 | Chun | ...................... B65B 35/18 |
| 2023/0182293 | A1 * | 6/2023 | Shaw | .................. B25J 15/0616 |
| | | | | 700/245 |
| 2024/0002147 | A1 * | 1/2024 | Yamane | ................. B25J 9/1612 |
| 2024/0165828 | A1 * | 5/2024 | Churchill | ............. B25J 15/0014 |
| 2024/0286289 | A1 * | 8/2024 | Ueda | ...................... B25J 9/1687 |
| 2025/0033086 | A1 * | 1/2025 | Blache | ....................... B07C 1/02 |
| 2025/0170727 | A1 * | 5/2025 | Yamane | .............. B25J 15/0616 |
| 2025/0304417 | A1 * | 10/2025 | Yamane | .................. B66F 9/181 |

FOREIGN PATENT DOCUMENTS

| | | | | |
|---|---|---|---|---|
| CN | 206871459 | U | 1/2018 | |
| CN | 208948349 | U | 6/2019 | |
| DE | 102010018963 | A1 * | 11/2011 | ............. B25J 15/00 |
| EP | 0192994 | A1 * | 9/1986 | |
| JP | 3-88624 | A | 4/1991 | |
| JP | 11-123687 | A | 5/1999 | |
| JP | 2016-55995 | A | 4/2016 | |
| JP | 2016-60039 | A | 4/2016 | |
| JP | WO2018/105121 | A | 6/2018 | |
| JP | 2018-122945 | A | 8/2018 | |
| WO | WO-2023167207 | A1 * | 9/2023 | |

OTHER PUBLICATIONS

Material Taking And Unloading Method Based On Visual Location And Device Thereof; Patent No. 115159149; Date Published: May 24, 2024; Inventor: Yuan, Li-cai; Application No. CN 202210898572 A; Date Filed: Jul. 28, 2022 (Year: 2024).*

* cited by examiner

ROBOT HAND, ROBOT, ROBOT SYSTEM, AND TRANSFER METHOD

CROSS-REFERENCE TO RELATED APPLICATIONS

The present application is based on PCT filing PCT/JP2020/029835, filed Aug. 4, 2020, which claims priority to JP 2019-143711, filed Aug. 5, 2019, the entire contents of each are incorporated herein by reference.

TECHNICAL FIELD

The present disclosure relates to a robot hand, a robot, a robot system, and a transfer method.

BACKGROUND ART

Conventionally, robots are used for transferring workpieces. For example, Patent Document 1 discloses a robot hand provided with suction assemblies which transfer workpieces by sucking the workpieces. This robot hand can move the suction assemblies, and accordingly, a distance between the suction assemblies can be changed.

REFERENCE DOCUMENT OF CONVENTIONAL ART

Patent Document

[Patent Document 1] JP2016-060039A

DESCRIPTION OF THE DISCLOSURE

Problem to be Solved by the Disclosure

In recent years, in a logistics field, works have been automated using robots. For example, a robot may be applied to transferring of cardboard cases. Cardboard cases may be accommodated in a piled-up state inside a surrounded space such as a container or a box-shaped truck bed. In this case, the robot is required to pull out and transfer the cardboard cases while causing a robot hand to approach the cardboard case from a side. However, the robot hand of Patent Document 1 is not suitable for such a transfer.

Therefore, one purpose of the present disclosure is to provide a robot hand, a robot, a robot system, and a transfer method, capable of transferring an article, such as a workpiece, by approaching the article from a side.

SUMMARY OF THE DISCLOSURE

In order to achieve the purpose, a robot hand according to one aspect of the present disclosure is a robot hand to transfer an article, which includes a holder to move the article in a first direction while holding the article, a driving belt having a transferring surface on which the article is placed and driven to move the transferring surface in the first direction, and a first driver to drive the driving belt. The holder moves in the first direction to place the held article onto the transferring surface.

A robot according to one aspect of the present disclosure includes the robot hand according to the aspect of the present disclosure, a robotic arm connected at an end thereof to the robot hand, and a controller to control operation of the driver of the robot hand, and operation of a fifth second driver to drive the robotic arm.

A robot system according to one aspect of the present disclosure includes the robot according to the aspect of the present disclosure, and a reception device to receive the article transferred by the robot. The robot hand further includes a base on which the article is placed. The base is formed with at least one notched part at an end thereof in a direction opposite from the first direction. The reception device includes at least one projection to pass through the notched part in an up-and-down direction. By the robotic arm lowering the robot hand toward the reception device, the robot hand inserts the at least one projection into the at least one notched part from below so that the at least one projection supports the article placed on the base.

A transfer method according to one aspect of the present disclosure is a transfer method of transferring an article by using the robot according to the aspect of the present disclosure. The method includes bringing, by the robotic arm, the holder of the robot hand to near the article, and holding the article by the holder, and driving the driving belt to move the transferring surface in the first direction while moving, by the robot hand, the holder holding the article in the first direction, and moving the article onto the transferring surface.

A transfer method according to one aspect of the present disclosure is a transfer method of transferring an article placed on a placing surface by using the robot according to the aspect of the present disclosure. The robot hand further includes a fourth driver to move the holder in a direction intersecting with the transferring surface and in a direction toward and away from the transferring surface. The method includes bringing, by the robotic arm, the robot hand to take a first posture in which the transferring surface inclines to be away from the placing surface with distance from the article. The method includes bringing, by the robotic arm, the holder of the robot hand taking the first posture to near the article, and holding the article by the holder. The method includes moving, by the robot hand, the holder holding the article in a direction away from the transferring surface, and driving the driving belt to move the transferring surface in the first direction while moving, by the robot hand, in the first direction the holder moved in the direction away from the transferring surface, and moving the article onto the transferring surface.

A transfer method according to one aspect of the present disclosure is a transfer method of transferring an article by using the robot system according to the aspect of the present disclosure. The method includes bringing, by the robotic arm, the holder of the robot hand to near the article, and holding the article by the holder, and driving the driving belt to move the transferring surface in the first direction while moving, by the robot hand, the holder holding the article in the first direction, and moving the article onto the transferring surface. The method includes moving, by the robotic arm, the robot hand so that the at least one notched part of the base is located above the at least one projection of the reception device. The method includes lowering, by the robotic arm, the robot hand so that the at least one projection is inserted into the at least one notched part from below, and moving, by the robotic arm, the robot hand to retreat from the reception device while the article is placed on the at least one projection.

Effect of the Disclosure

According to the technology of the present disclosure, an article can be transferred by being approached from the side.

MODES FOR CARRYING OUT THE DISCLOSURE

Figure 1:
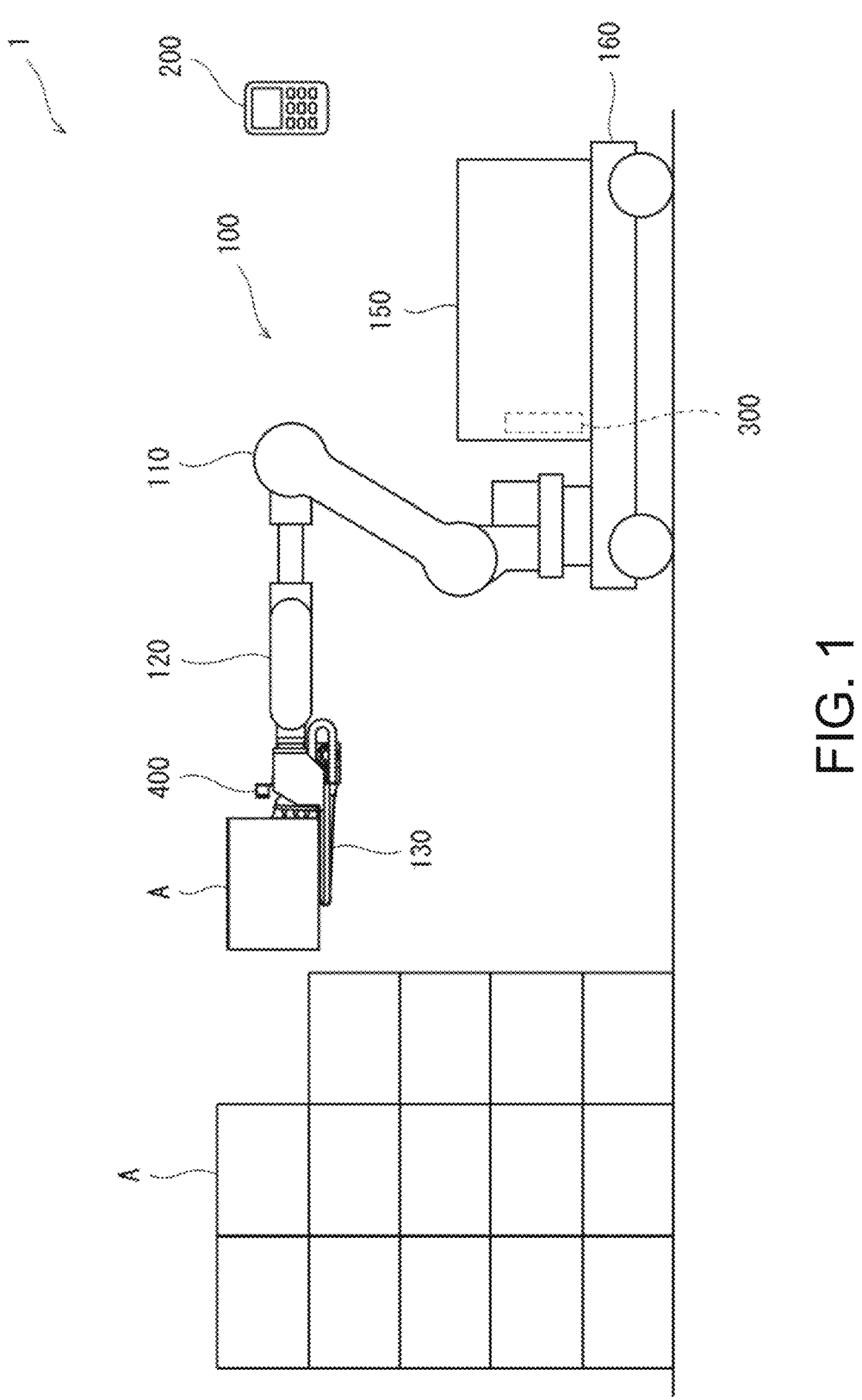
FIG. 1 is a view illustrating one example of a configuration of a robot system according to one embodiment.

Hereinafter, one embodiment of the present disclosure is described with reference to the drawings. The embodiment which will be described below is to illustrate a comprehensive or concrete example. Components which are not cited in the independent claim that is the broadest concept among components in the following embodiment will be described as arbitrary components. Each figure in the accompanying drawings is a schematic figure, and is not necessarily illustrated exactly. Moreover, in each figure, the same reference characters are assigned to substantially the same components, and therefore, redundant description may be omitted or simplified. The term "device" or "apparatus" as used in this specification and the appended claims may mean a system including devices or apparatuses, other than meaning a sole device or apparatus.

<Configuration of Robot System>

A configuration of a robot system 1 according to one embodiment is described. FIG. 1 is a view illustrating one example of a configuration of the robot system 1 according to this embodiment. As illustrated in FIG. 1, in the following embodiment, the robot system 1 is described to perform a work of transferring articles A which are piled up at a certain location to another location or a device, by using a robot 100. Moreover, in this embodiment, the article A which is a transfer target is a cardboard case. The article A may be other objects with a certain shape, or objects without a certain shape.

The robot system 1 according to this embodiment is provided with the robot 100, an input device 200, a controller 300, and an image capture 400 as components. Although in this embodiment the robot 100 can autonomously move to various locations on a floor etc., it may be configured to be moved by another device, or disposed fixedly. Although the controller 300 is disposed at the robot 100 and the input device 200 is disposed separately from the robot 100, disposing locations thereof are not limited to these.

[Robot]

Figure 2:
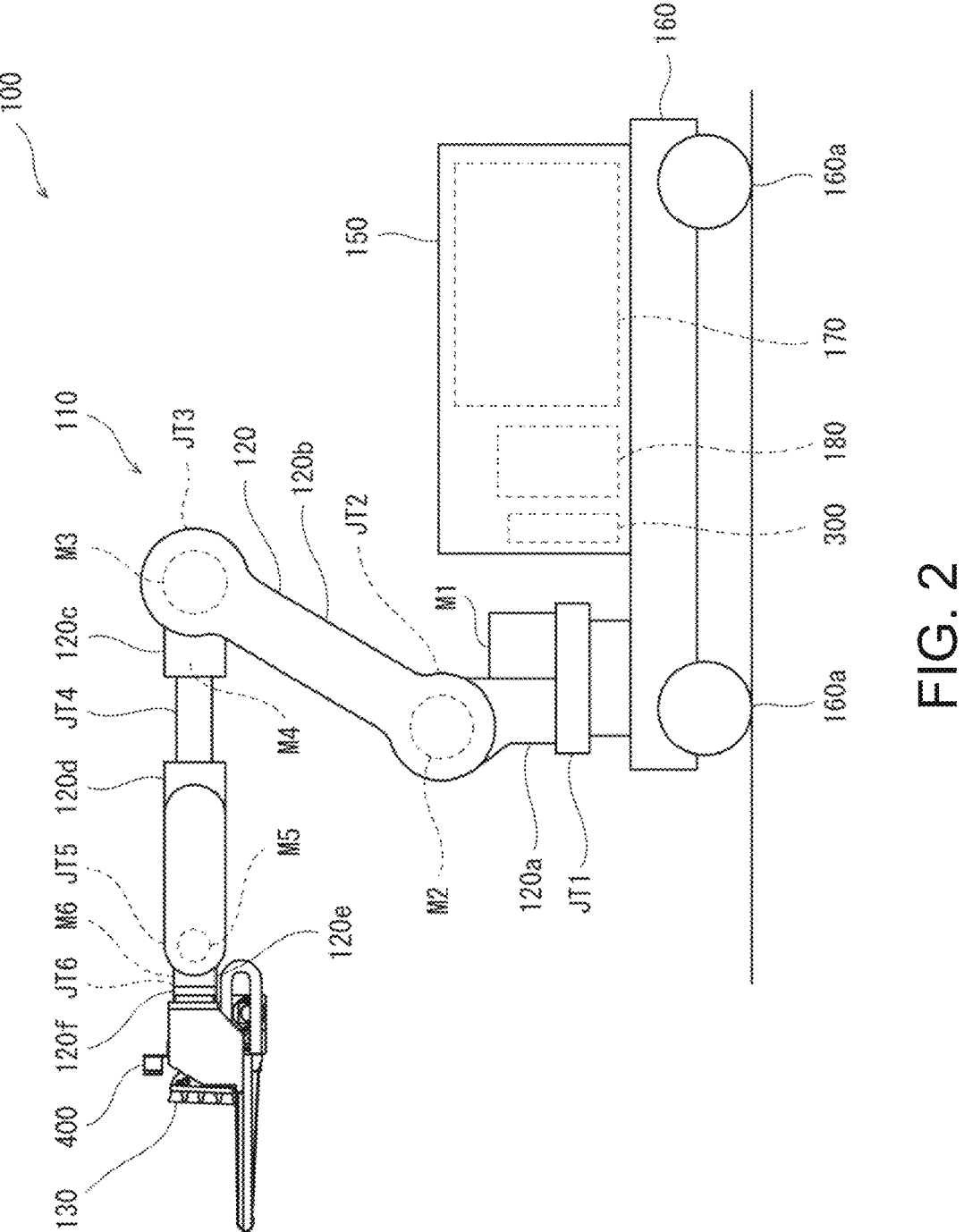
FIG. 2 is a side view illustrating one example of a configuration of a robot according to this embodiment.

FIG. 2 is a side view illustrating one example of the configuration of the robot 100 according to this embodiment. As illustrated in FIGS. 1 and 2, the robot 100 includes a robot body 110, an apparatus accommodating part 150, and a transfer vehicle 160. The robot body 110 includes a robotic arm 120 and a robot hand (may be referred to as an "end effector") 130. The robot body 110 and the apparatus accommodating part 150 are mounted on the transfer vehicle 160.

The transfer vehicle 160 can move the robot 100 on the floor etc., and includes wheels 160a as a traveling device, and a transfer driver 160b (not illustrated) which drives the wheels 160a. However, without being limited to this, the transfer vehicle 160 may be provided with another traveling device, such as a crawler (may be referred to as a "Caterpillar®"). Although the transfer driver 160b uses electric power as a driving source and has a servomotor as an electric motor, it is not limited to this configuration. The transfer vehicle 160 may be an AGV (Automated Guided Vehicle), for example.

The apparatus accommodating part 150 accommodates apparatuses including the controller 300, a power supply 170, and a negative pressure generator 180. The power supply 170 supplies electric power to the components of the robot 100 which consume electric power. The power supply 170 may be provided with batteries (e.g., a primary battery, a secondary battery, and fuel cells), may be connected to an external power source (e.g., a commercial power supply or a device outside the robot 100) through a wire, or may be provided with the battery and connected to the external power source. The power supply 170 supplies electric power of the battery and/or electric power of the external power source to each component.

The primary battery can only discharge the electric power. The secondary battery is a battery capable of charging and discharging the electric power, and may be a lead-acid battery, a lithium-ion secondary battery, a nickel-metal hydride battery, or a nickel-cadmium battery, for example.

The negative pressure generator 180 generates negative pressure at a suctioner 134aak (k=a natural number from 1 to n) of the robot hand 130 (described later). A configuration of the negative pressure generator 180 is not particularly limited, as long as it can generate negative pressure at the suctioner 134aak, and any existing configuration may be used. For example, the negative pressure generator 180 may have a configuration of a vacuum pump or a pneumatic cylinder which generates negative pressure or a vacuum by sucking air, or a configuration of an ejector which generates negative pressure or a vacuum by feeding compressed air. The operation of the negative pressure generator 180 is controlled by the controller 300.

[Robotic Arm]

A base part of the robotic arm 120 is fixedly attached to the transfer vehicle 160, and the robot hand 130 is attached to a tip of the robotic arm 120. The robot hand 130 transfers one of piled-up articles A by approaching the article A from a side and pulling it out to be placed on the robot hand 130. The operations of the robotic arm 120 and the robot hand 130 are controlled by the controller 300. Although the robotic arm 120 is a vertical articulated robotic arm as will be described later, the robotic arm 120 is not limited to this and may be, for example, a robotic arm of a horizontal articulated type, a polar coordinate type, a cylindrical-coordinate type, a Cartesian-coordinate type, or other types.

The robotic arm 120 includes links 120a to 120f disposed from a base part to a tip end of the robotic arm 120 in order, joints JT1 to JT6 serially connecting the links 120a to 120f, and arm drivers M1 to M6 which rotary drive the joints JT1-JT6, respectively. Operations of the arm drivers M1-M6 are controlled by the controller 300. Although each of the arm drivers M1-M6 uses electric power as a driving source, and has a servomotor as an electric motor which drives the arm driver, it is not limited to this configuration. The arm drivers M1-M6 are one example of a second driver. The number of joints of the robotic arm 120 is not limited to six, but may be seven or more, or one or more and five or less.

The link 120a is attached to the transfer vehicle 160. A tip-end of the link 120f constitutes a mechanical interface and is connected to the robot hand 130. The joint JT1 couples the transfer vehicle 160 and a base-end of the link 120a so as to be rotatable about a vertical axis perpendicular to the floor which supports the transfer vehicle 160. The joint JT2 couples a tip-end of the link 120a and a base-end of the link 120b so as to be rotatable about a horizontal axis parallel with the floor. The joint JT3 couples a tip-end of the link 120b and a base-end of the link 120c so as to be rotatable about a horizontal axis. The joint JT4 couples a tip-end of the link 120c and a base-end of the link 120d so as to be rotatable about an axis extending in a longitudinal direction of the link 120c. The joint JT5 couples a tip-end of the link 120d and a base-end of the link 120e so as to be rotatable about an axis perpendicular to a longitudinal direction of the link 120d. The joint JT6 couples a tip-end of the link 120e and a base-end of the link 120f so as to be rotatable in a twisted manner with respect to the link 120e.

[Robot Hand]

Figure 3:
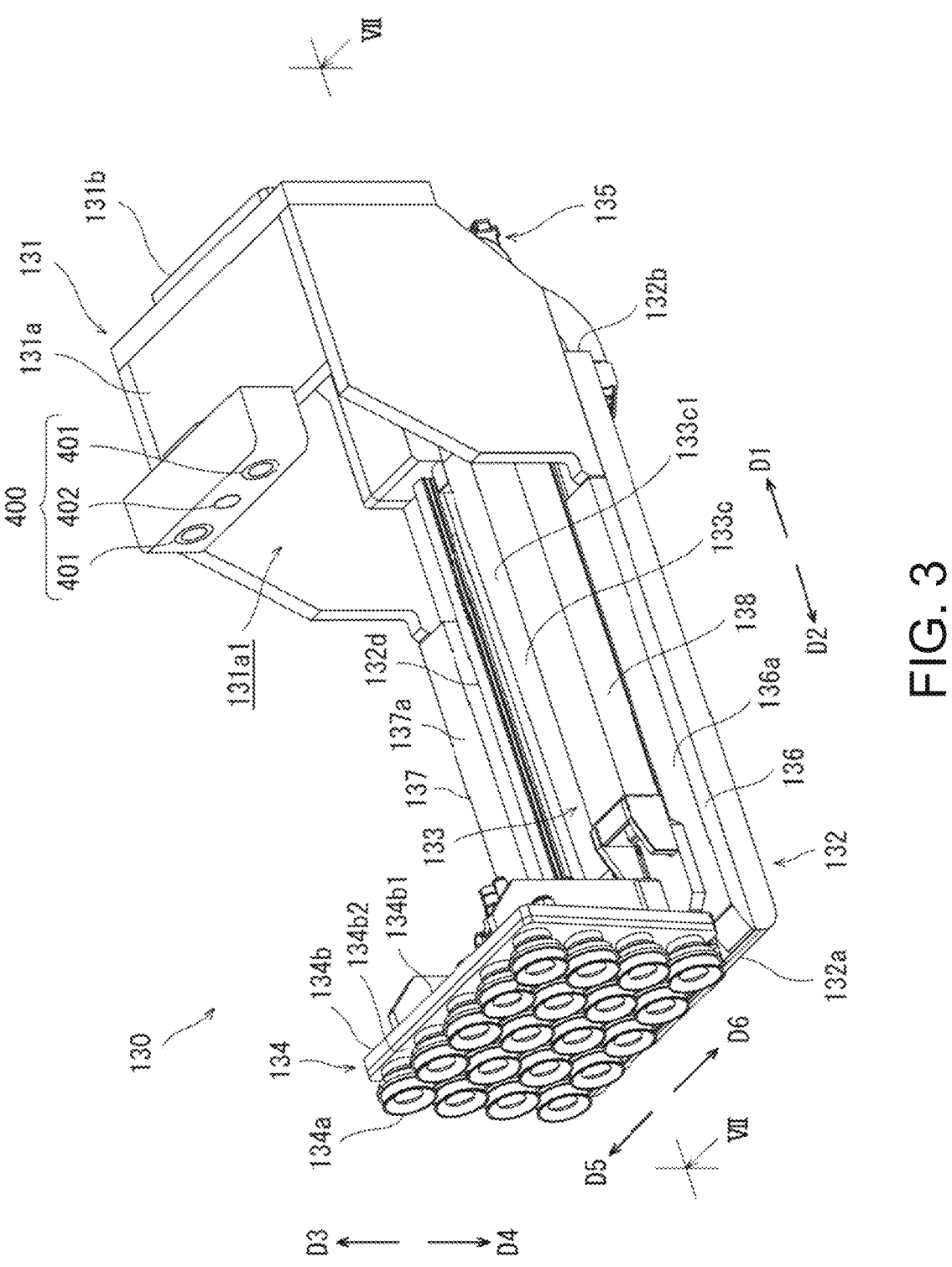
FIG. 3 is a perspective view illustrating one example of a configuration in one state of a robot hand according to this embodiment.
Figure 4:
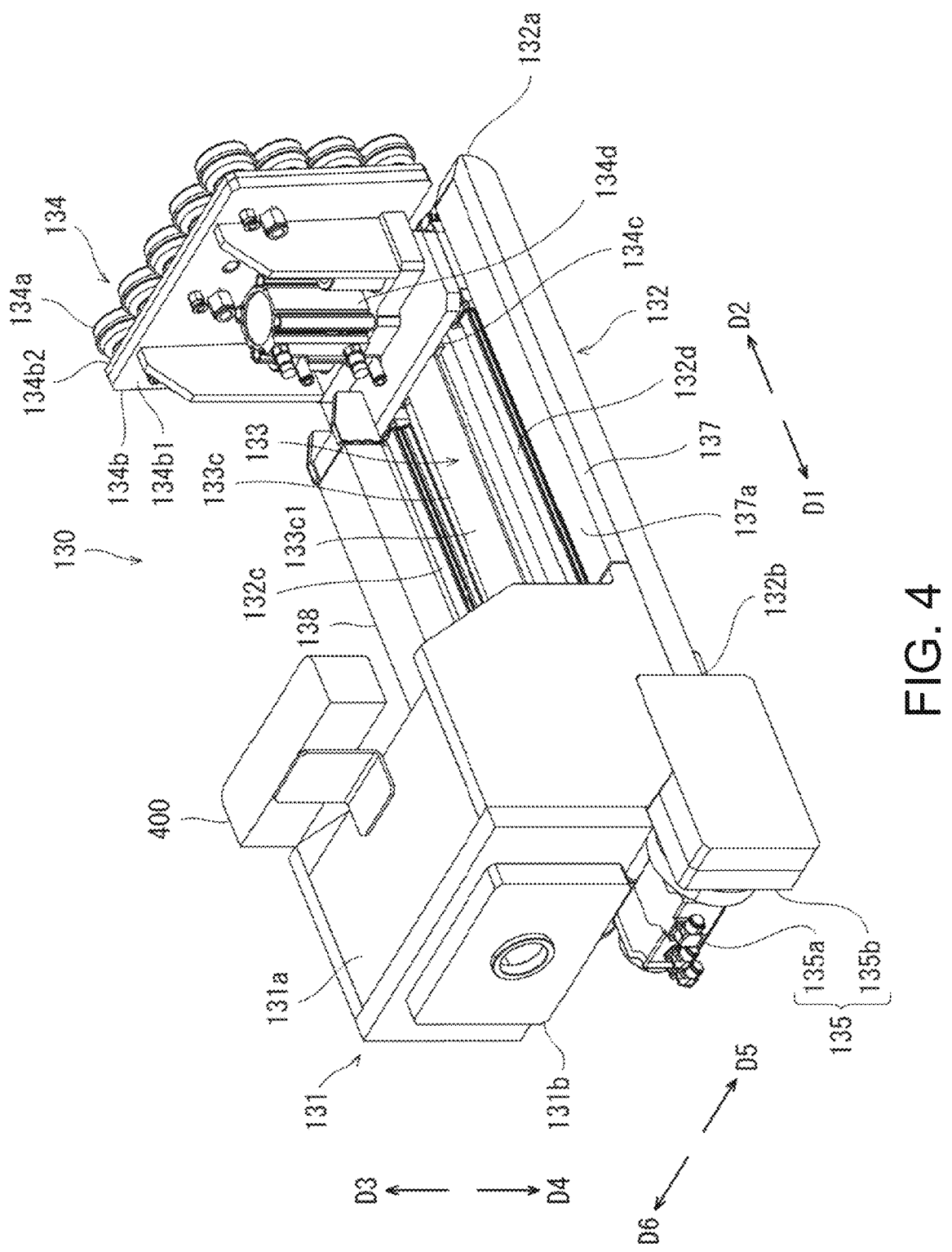
FIG. 4 is a perspective view of the robot hand illustrated in FIG. 3, when seen from a back side.
Figure 5:
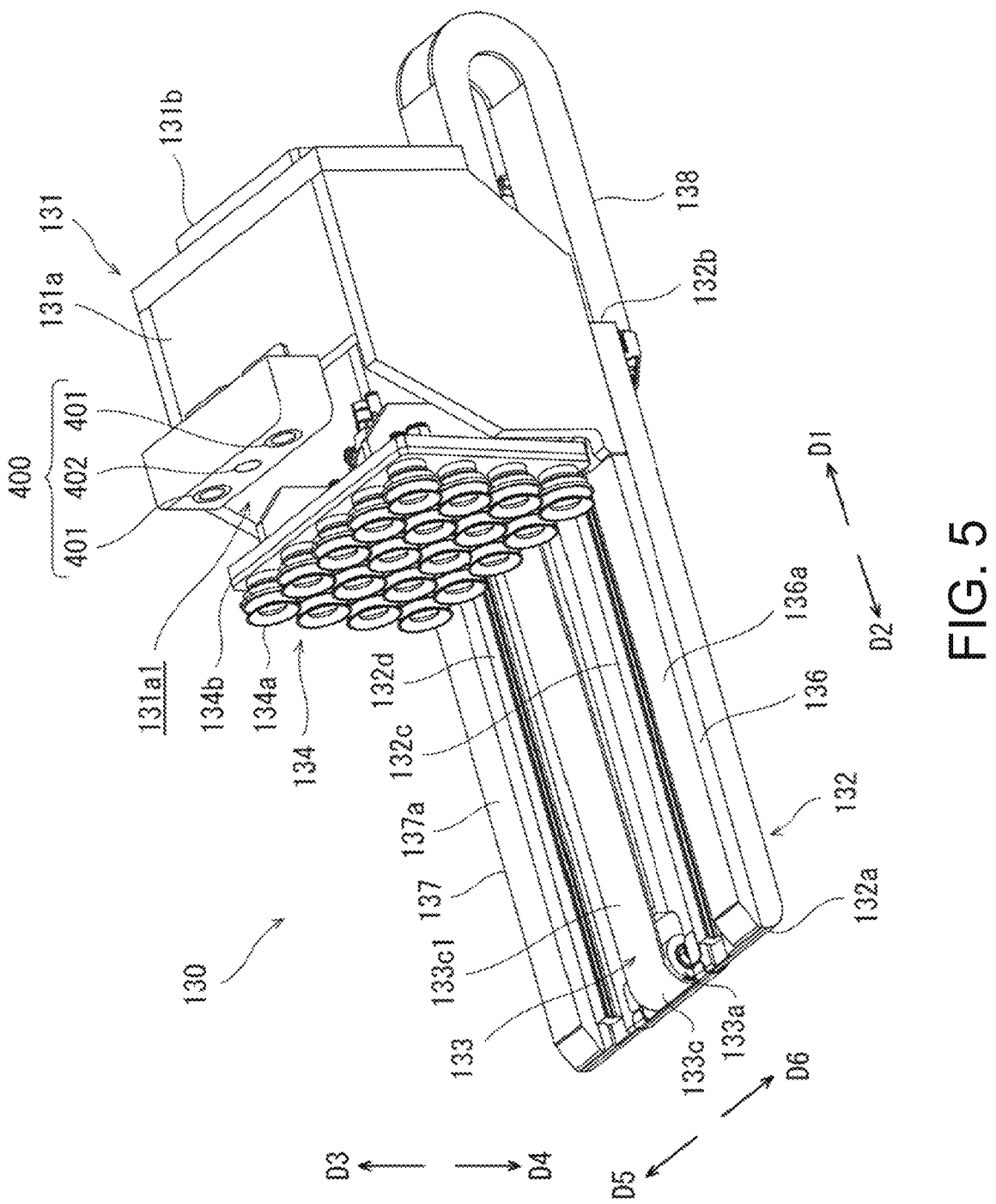
FIG. 5 is a perspective view illustrating one example of a configuration in another state of the robot hand according to this embodiment.
Figure 6:
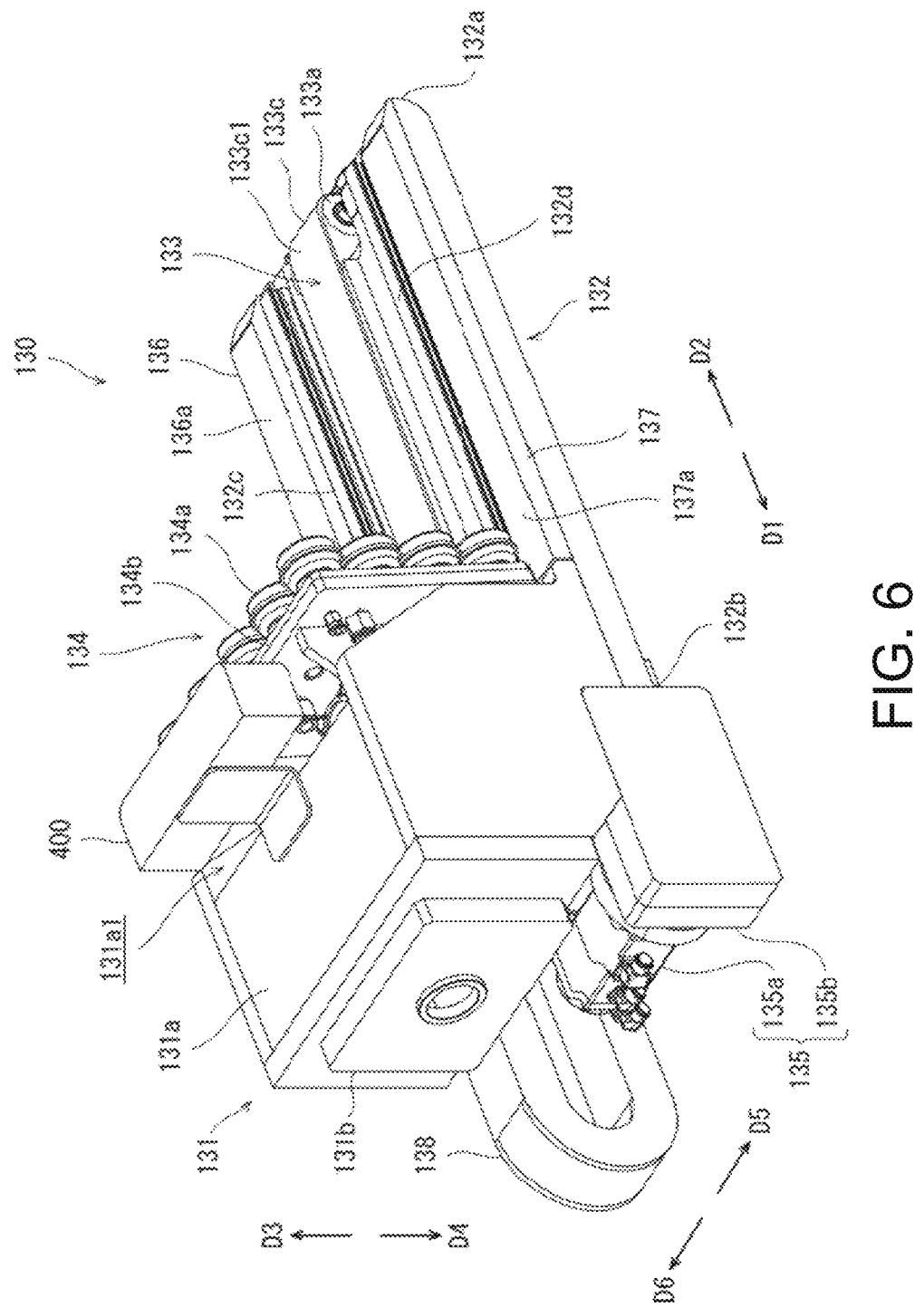
FIG. 6 is a perspective view of the robot hand illustrated in FIG. 5, when seen from the back side.
Figure 7:
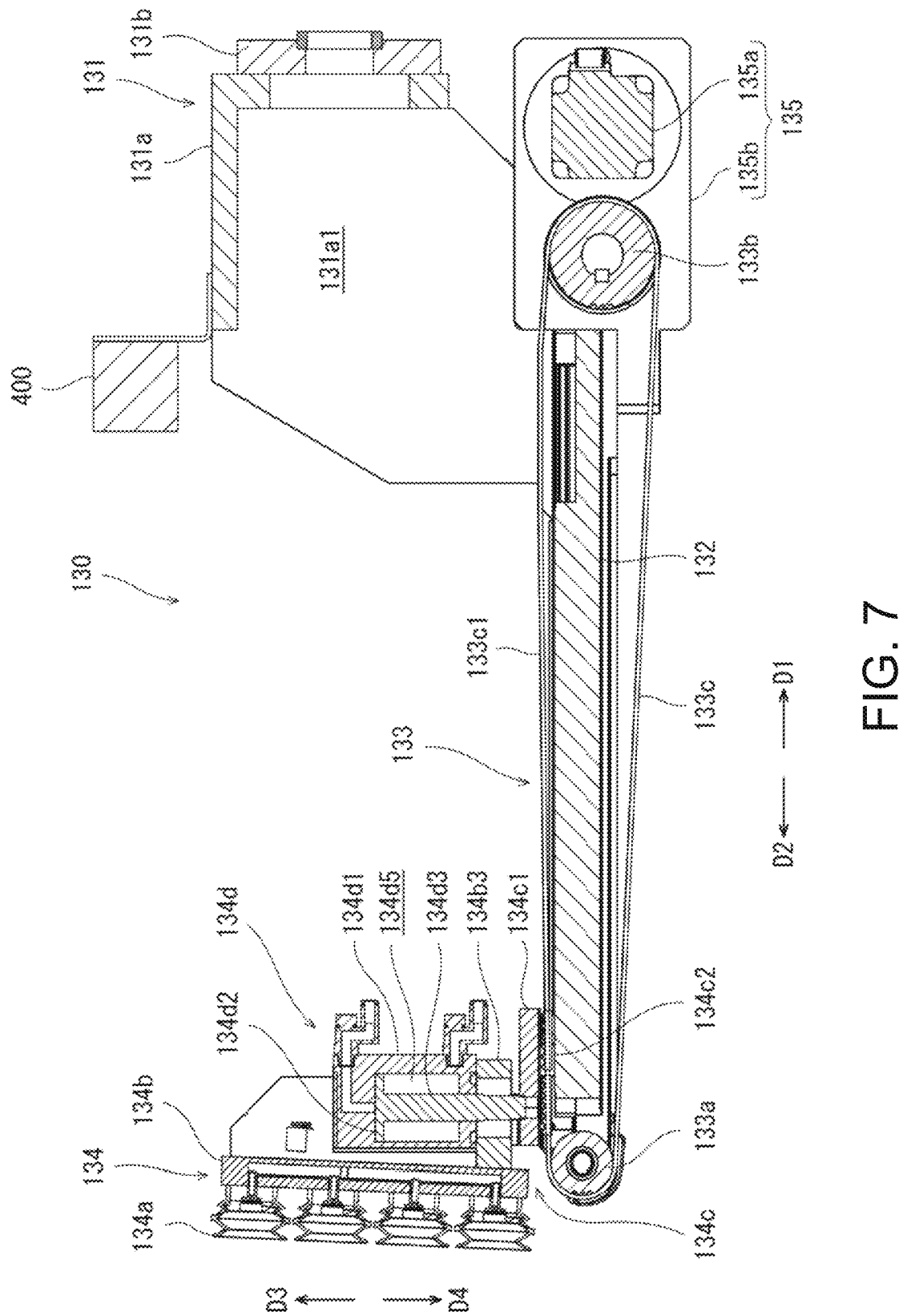
FIG. 7 is a cross-sectional side view of the robot hand illustrated in FIG. 3, when cut vertically along a driving belt and seen in a direction VII.

FIG. 3 is a perspective view illustrating one example of a configuration in one state of the robot hand 130 according to this embodiment. FIG. 4 is a perspective view of the robot hand 130 illustrated in FIG. 3, when seen from a back side. FIG. 5 is a perspective view illustrating one example of a configuration in another state of the robot hand 130 according to this embodiment. FIG. 6 is a perspective view of the robot hand 130 illustrated in FIG. 5, when seen from the back side. In FIGS. 5 and 6, a holder 134 (described later) is slid in a first direction D1, compared to FIGS. 3 and 4. FIG. 7 is a cross-sectional side view of the robot hand 130 illustrated in FIG. 3, when cut vertically along a driving belt 133c and seen in a direction VII.

As illustrated in FIGS. 3 to 6, the robot hand 130 is provided with an attachment base part 131, a base 132, a belt driving mechanism 133, the holder 134, and a belt driver 135. The holder 134 is movable in the direction D1 and a direction D2 with respect to the base 132.

The base 132 supports the holder 134, and can place the article A on the base 132. The base 132 includes, for example, a rectangular plate-like member of which the longitudinal direction is the first direction D1. The base 132 is provided on its upper surface with sliding members 136 and 137. The sliding members 136 and 137 are belt-like members extending in the first direction D1, and disposed having an interval therebetween in a fifth direction D5. Although in this embodiment the sliding members 136 and 137 extend parallelly with each other, it is not limited to this configuration. The upper surface of the base 132 is a surface facing in a third direction D3.

Here, the first direction D1 is a direction along a longitudinal direction of the base 132 and is oriented from an end 132a to an end 132b. The ends 132a and 132b are ends of the base 132 on both sides in the longitudinal direction. The second direction D2 is an opposite direction from the first direction D1. The fifth direction D5 is a direction along an upper surface of the base 132, oriented from the sliding member 136 to the sliding member 137, and perpendicular to the directions D1 and D2. A sixth direction D6 is an opposite direction from the fifth direction D5. The third direction D3 is a direction perpendicular to the directions D1, D2, D5, and D6 and is oriented from the base 132 to the sliding members 136 and 137. A fourth direction D4 is an opposite direction from the third direction D3.

The sliding members 136 and 137 are equivalent in height in the third direction D3, and have smooth and flat upper surfaces 136a and 137a, respectively. The sliding members 136 and 137 are made of, for example, material which is low in friction coefficient against the article A, and gives small influence (e.g., damage) on a surface of the article A. The component material of the sliding members 136 and 137 may be resin, for example. The sliding members 136 and 137 made of resin can contribute to a reduction in weight of the robot hand 130.

The attachment base part 131 is connected to the link 120*f* of the robotic arm 120. The attachment base part 131 is disposed and fixed to the third direction D3 side of the base 132, and disposed on the first direction D1 side of the sliding members 136 and 137. The attachment base part 131 includes an accommodating part 131*a* and a connecting part 131*b*. The accommodating part 131*a* is made of an inverse U-shaped member crossing over the base 132 in the directions D5 and D6, and forms an accommodation space 131*a*1 therein. The accommodation space 131*a*1 accommodates components of the holder 134 moved in the first direction D1. The connecting part 131*b* is connected to a part of the accommodating part 131*a* on the first direction D1 side, and connected to the link 120*f*.

The belt driving mechanism 133 is disposed at the base 132 between the sliding members 136 and 137. As illustrated in FIG. 7, the belt driving mechanism 133 is provided with rotatable rollers 133*a* and 133*b*, and the driving belt 133*c* in an endless wheel shape. The rollers 133*a* and 133*b* are disposed at the base 132 having an interval therebetween in the first direction D1, and a direction of the rotational axes of the rollers 133*a* and 133*b* is the fifth direction D5. The rollers 133*a* and 133*b* are disposed near the ends 132*a* and 132*b* (see FIG. 3) of the base 132, and are embedded in through-holes penetrating the base 132 in the third direction D3, respectively.

The driving belt 133*c* is bridged over the rollers 133*a* and 133*b* through the two through-holes. The driving belt 133*c* extends in the first direction D1 on both sides of the upper surface and a lower surface of the base 132 which face the directions D3 and D4, respectively. On the upper surface of the base 132, the driving belt 133*c* forms on its outer circumferential surface a transferring surface 133*c*1 which extends in the first direction D1 and faces the third direction D3. By the rollers 133*a* and/or 133*b* being rotary driven, the driving belt 133*c* circles around them, and the transferring surface 133*c*1 is moved in the first direction D1 or the second direction D2. The driving belt 133*c* may not have an endless wheel shape. For example, the driving belt 133*c* may be wound around the rollers 133*a* and 133*b*. By the rollers 133*a* and 133*b* rotating to send out or to wind therearound the driving belt 133*c*, the transferring surface 133*c*1 may be moved in the first direction D1 or the second direction D2.

The height of the transferring surface 133*c*1 in the third direction D3 is equivalent to the height of the upper surfaces 136*a* and 137*a* of the sliding members 136 and 137. Therefore, the article A can be simultaneously placed on the transferring surface 133*c*1 and the upper surfaces 136*a* and 137*a*. The driving belt 133*c* can move the article A on the upper surfaces 136*a* and 137*a* in the first direction D1 or the second direction D2, by moving the transferring surface 133*c*1.

The belt driver 135 is disposed near the roller 133*b*, and rotary drives the roller 133*b*. The belt driver 135 is provided with a servomotor 135*a* as an electric motor, and a speed reducer 135*b*. The speed reducer 135*b* reduces a rotational speed of the servomotor 135*a* and increases the rotary driving force, and transmits the rotary driving force to the roller 133*b*. The belt driver 135 is one example of a first driver.

As illustrated in FIGS. 3 to 6, the holder 134 is disposed on the third direction D3 side of the driving belt 133*c* so as to be movable in the directions D1 and D2. The holder 134 includes an adhesion part 134*a*, a supporting body 134*b*, a fixing part 134*c*, and a lifter 134*d*.

As illustrated in FIGS. 4 and 7, the supporting body 134*b* supports the adhesion part 134*a*, and is connected to the fixing part 134*c* through the lifter 134*d*. For example, the supporting body 134*b* includes a rectangular plate-like member, and stands in the third direction D3 with respect to the sliding members 136 and 137 and the transferring surface 133*c*1. The supporting body 134*b* includes surfaces 134*b*1 and 134*b*2 facing the directions D1 and D2, respectively. The adhesion part 134*a* is disposed on the surface 134*b*2, and the lifter 134*d* is disposed on the surface 134*b*1.

Figure 8:
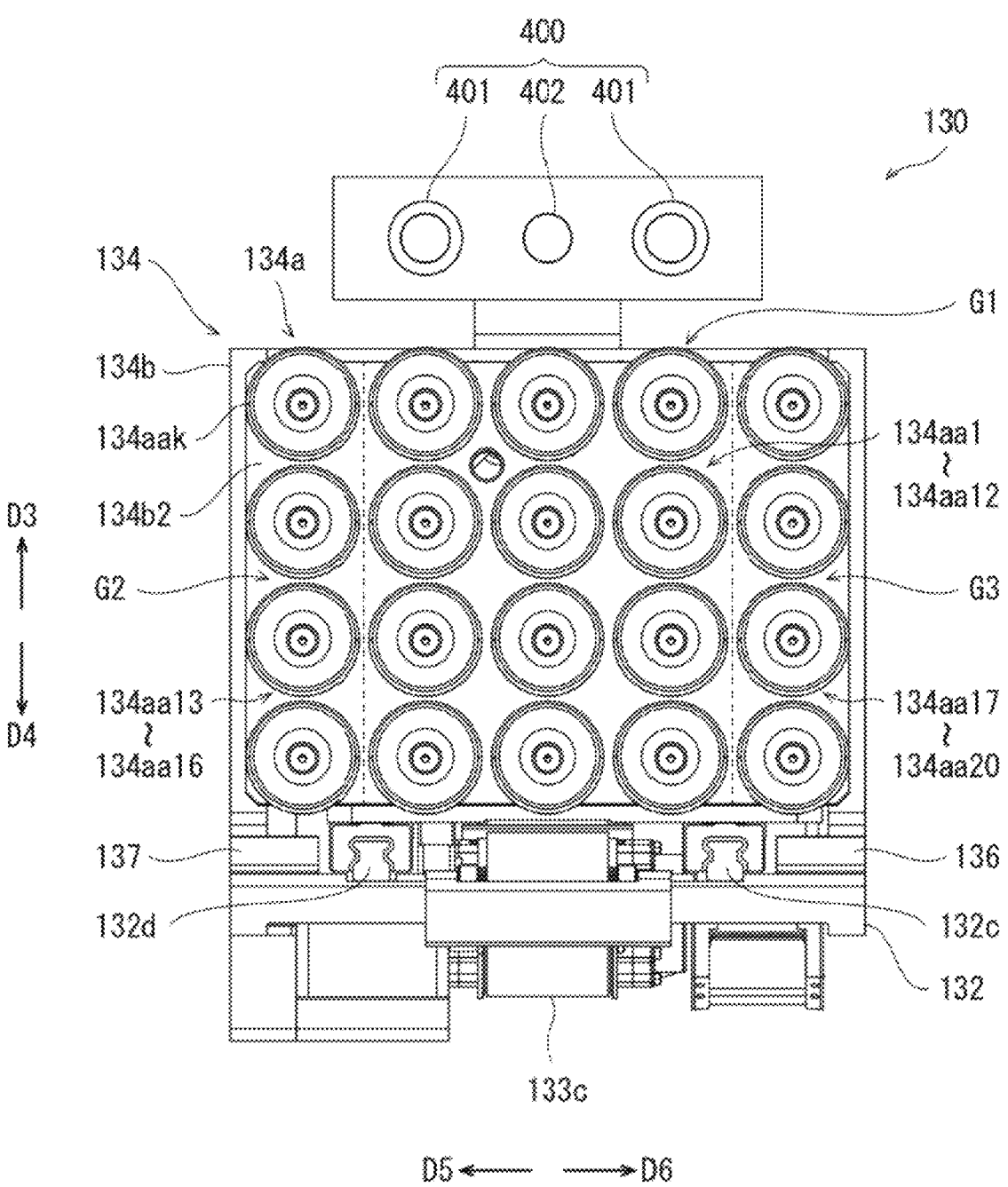
FIG. 8 is a front view illustrating a holder illustrated in FIG. 3, when seen in a first direction.
Figure 9:
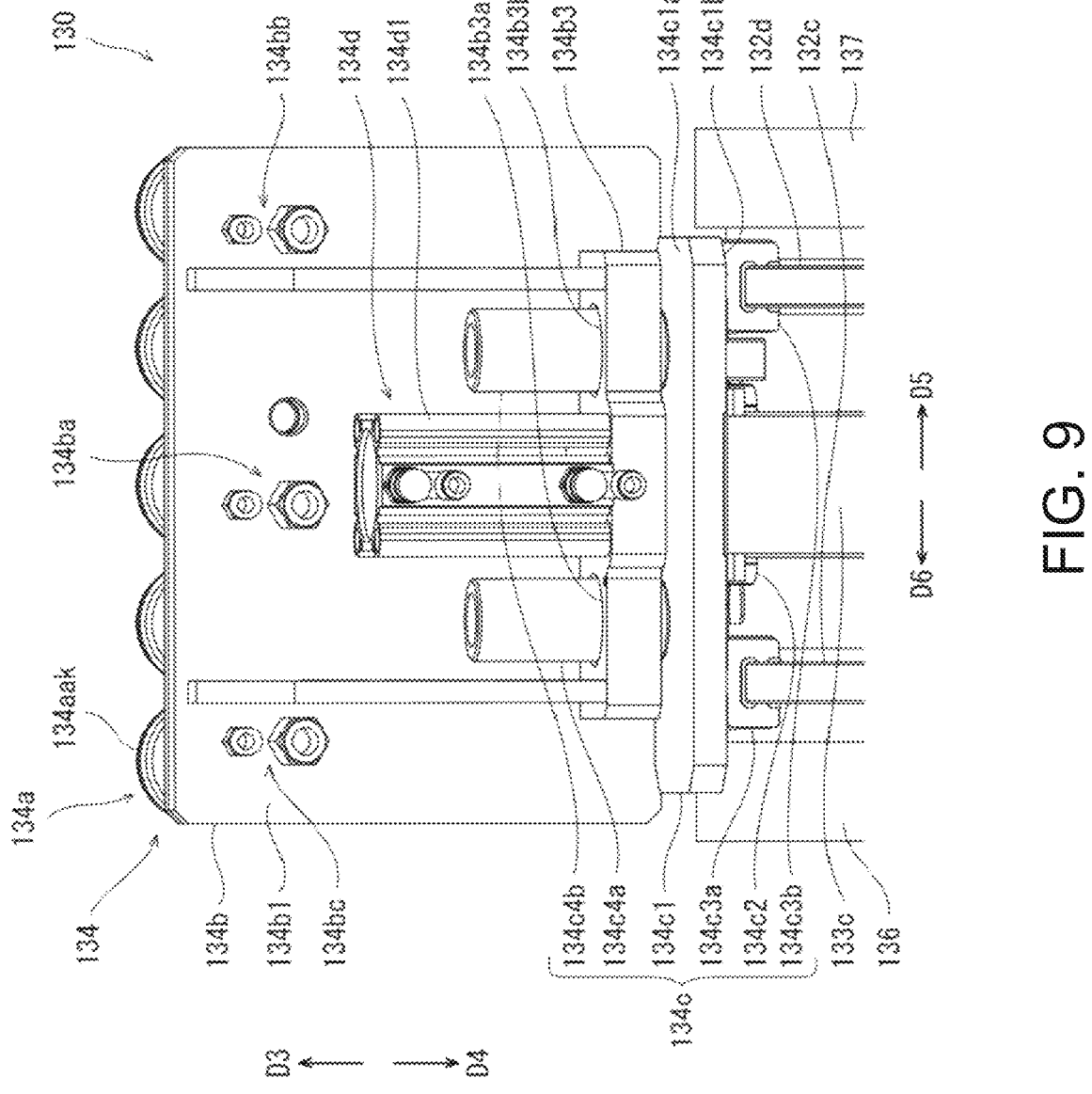
FIG. 9 is a back view illustrating the holder illustrated in FIG. 3, when seen in a second direction.

FIG. 8 is a front view illustrating the holder 134 illustrated in FIG. 3, when seen in the first direction D1. FIG. 9 is a back view illustrating the holder 134 illustrated in FIG. 3, when seen in the second direction D2. As illustrated in FIG. 8, the adhesion part 134*a* includes suctioners 134*aak* (k=a natural number from 1 to n) disposed on the surface 134*b*2. Each suctioner 134*aak* has, but not limited to this, for example, a hollow nozzle shape. In this embodiment, each suctioner 134*aak* has a hollow bellows shape, and is expandable and contractible. Therefore, even when the surface of the article A has an unevenness or an inclination, and is not in parallel with the surface 134*b*2 of the supporting body 134*b*, the suctioners 134*aak* can contact and suck the surface. Each suctioner 134*aak* is directed in the second direction D2 so as to suck the article A existing on the second direction D2 side. Accordingly, the holder 134 is directed so as to hold the article A existing on the second direction D2 side by using the suctioners 134*aak*.

In this embodiment, twenty suctioners 134*aa*1-134*aa*20 are disposed. The suctioners 134*aa*1-134*aa*20 are arranged to form four rows extending in the fifth direction D5 and five columns extending in the third direction D3 (4 rows×5 columns). The suctioners 134*aa*1-134*aa*12 constitute a first suctioner group G1, and are arrayed to have a rectangular shape in "4 rows×3 columns." The suctioners 134*aa*13-134*aa*16 constitute a second suctioner group G2, and are arrayed in "4 rows×1 column" at a position on the fifth direction D5 side of the first suctioner group G1. The suctioners 134*aa*17-134*aa*20 constitute a third suctioner group G3, and are arrayed in "4 rows×1 column" at a position on the sixth direction D6 side of the first suctioner group G1.

As illustrated in FIGS. 7 and 8, the suctioners 134*aa*1-134*aa*20 as described above are lined up in a direction intersecting with the transferring surface 133*c*1 of the driving belt 133*c* (in detail, the directions D3 and D4 substantially perpendicular to the transferring surface 133*c*1), and in a direction toward and away from the transferring surface 133*c*1. Moreover, the suctioner 134*aak* distant from the transferring surface 133*c*1 is positioned on the first direction D1 side compared to the suctioner 134*aak* near the transferring surface 133*c*1. The supporting body 134*b* is slightly inclined in the directions D1 and D2 with respect to the direction perpendicular to the transferring surface 133*c*1 (in detail, slightly inclined toward the first direction D1 with distance from the transferring surface 133*c*1 toward the third direction D3).

As illustrated in FIGS. 8 and 9, the suctioners 134*aa*1-134*aa*12 communicate with a first piping system 181 (not illustrated) via a connection port 134*ba* on the surface 134*b*1. The suctioners 134*aa*13-134*aa*16 communicate with a second piping system 182 (not illustrated) via a connection port 134*bb* on the surface 134*b*1. The suctioners 134*aa*17-134*aa*20 communicate with a third piping system 183 (not illustrated) via a connection port 134*bc* on the surface 134*b*1. The piping systems 181-183 are separate piping systems, and each connected to the negative pressure generator 180. Piping, electric cables, etc., extending from the holder 134 (e.g., the piping of the piping systems 181-183) extend to a connection destination, such as the negative pressure generator 180, through inside of an accommodation duct 138 (see FIG. 3) disposed at the base 132. Although the accommodation duct 138 is, for example, a Cableveyor® which is freely bendable, it may have other configurations, as long as it can accommodate the piping and the electric cables. Among the piping systems 181-183, at least arbitrary two of them are examples of a first system and a second system, respectively.

The negative pressure generator 180 selects at least one of the piping systems 181-183, and generate negative pressure at the piping system. That is, the negative pressure generator 180 can select one of the suctioner groups G1-G3 to carry out sucking. For example, by the selection from the suctioner groups G1-G3 to generate the negative pressure corresponding to the shape, size, etc., of the article A, the article A can be sucked efficiently.

As illustrated in FIGS. 7 and 9, the fixing part 134*c* fixes the supporting body 134*b* to the driving belt 133*c* (in detail, the driving belt 133*c* on the upper surface of the base 132). The supporting body 134*b* is moved in the directions D1 and D2 together with the transferring surface 133*c*1, by the driving belt 133*c* via the fixing part 134*c*. The fixing part 134*c* includes a base plate 134*c*1, a pinching part 134*c*2, sliding guides 134*c*3*a* and 134*c*3*b*, and lifting guides 134*c*4*a* and 134*c*4*b*. The base plate 134*c*1, the sliding guides 134*c*3*a* and 134*c*3*b*, and the lifting guides 134*c*4*a* and 134*c*4*b* are integrated.

The base plate 134*c*1 is a plate-like member, and disposed on the third direction D3 side of the driving belt 133*c* to be extended in the fifth direction D5 while crossing over the driving belt 133*c*. The base plate 134*c*1 includes surfaces 134*c*1*a* and 134*c*1*b* facing the directions D3 and D4, respectively.

The pinching part 134*c*2 is a member disposed between the base 132 and the driving belt 133*c*. The pinching part 134*c*2 and the surface 134*c*1*b* of the base plate 134*c*1 are connected to each other while pinching the driving belt 133*c* therebetween, and thus, the base plate 134*c*1 is fixed to the driving belt 133*c*.

The sliding guides 134*c*3*a* and 134*c*3*b* are disposed at both sides of the driving belt 133*c* in the directions D6 and D5, respectively, and fixed to the surface 134*c*1*b* of the base plate 134*c*1. Recesses of the sliding guides 134*c*3*a* and 134*c*3*b* are fitted with base guides 132*c* and 132*d* which are band-shaped protrusions, respectively, so as to be slidable in the directions D1 and D2. The base guides 132*c* and 132*d* are fixed to or integrated with the base 132, and extend along the driving belt 133*c* in the first direction D1 on both of the directions D5 and D6 sides of the driving belt 133*c*, respectively, and in this embodiment, they are parallel with each other. The sliding guides 134*c*3*a* and 134*c*3*b* are disposed to be separate from each other on the both sides of the driving belt 133*c*, and the base guides 132*c* and 132*d* are disposed to be separate from each other on the both sides of the driving belt 133*c*. Therefore, a displacement of the base plate 134*c*1 in an unintended direction can be reduced while guiding the motion of the base plate 134*c*1 with respect to the base 132 in the directions D1 and D2.

The lifting guides 134*c*4*a* and 134*c*4*b* are pillar-shaped members extending in the third direction D3, and in this embodiment, they are parallel with each other. The lifting guides 134*c*4*a* and 134*c*4*b* are fixed to the surface 134*c*1*a* of the base plate 134*c*1 on both of the directions D5 and D6 sides of the lifter 134*d*, respectively. The lifting guides 134*c*4*a* and 134*c*4*b* penetrate guiding holes 134*b*3*a* and 134*b*3*b* of a supporting body guide 134*b*3, respectively. The supporting body guide 134*b*3 is a plate-like member protruding from the surface 134*b*1 of the supporting body 134*b* in the first direction D1, and has the guiding holes 134*b*3*a* and 134*b*3*b* penetrating in the directions D3 and D4. The lifting guides 134*c*4*a* and 134*c*4*b*, and the supporting body guide 134*b*3 guide the motion of the supporting body 134*b* with respect to the base plate 134*c*1 in the directions D3 and D4. The lifting guides 134*c*4*a* and 134*c*4*b* which are disposed away from each other in the fifth direction D5 suppress the supporting body 134*b* from rotating with respect to the base plate 134*c*1, centering on an axis extending in the third direction D3.

The lifter 134*d* is disposed on the surface 134*c*1*a* of the base plate 134*c*1 and connected to the supporting body guide 134*b*3 and the base plate 134*c*1. The supporting body 134*b* is supported by the base plate 134*c*1 via the lifter 134*d*. The lifter 134*d* expands and contracts in the directions D3 and D4, and moves the supporting body guide 134*b*3 with respect to the base plate 134*c*1 in the directions D3 and D4. That is, the lifter 134*d* lifts and lowers the supporting body 134*b* with respect to the base 132 in the directions D3 and D4. The lifter 134*d* is one example of a fourth driver.

Although in this embodiment the lifter 134*d* includes a pneumatic cylinder, it may have other configurations, as long as it lifts and lowers the supporting body 134*b* with respect to the fixing part 134*c* in the directions D3 and D4. For example, the lifter 134*d* may be provided with a hydraulic or electric cylinder, an electric linear actuator, or a thread mechanism. The thread mechanism is, for example, a mechanism which includes a threaded rod and a nut (e.g., a ball nut) to be threadedly engaged with the threaded rod, and converts the rotational motion of the nut to the linear motion of the threaded rod. In a case where the lifter 134*d* is driven to ascend and descend by electric power, it may include, for example, a motor or a linear actuator, etc., which is servo-controlled.

Figure 10:
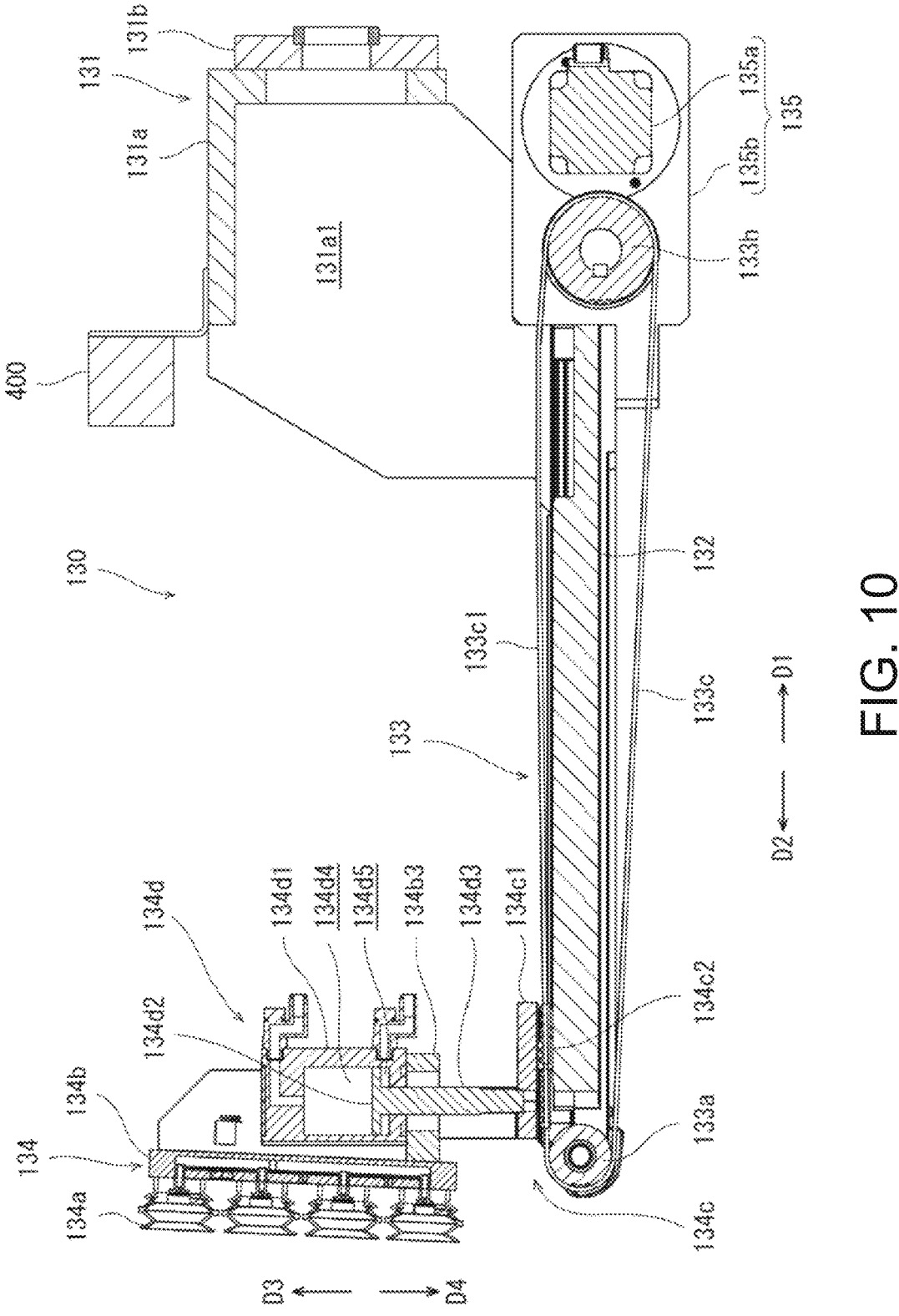
FIG. 10 is a cross-sectional side view of the robot hand illustrated in FIG. 7, in a state where a lifter is expanded.
Figure 11:
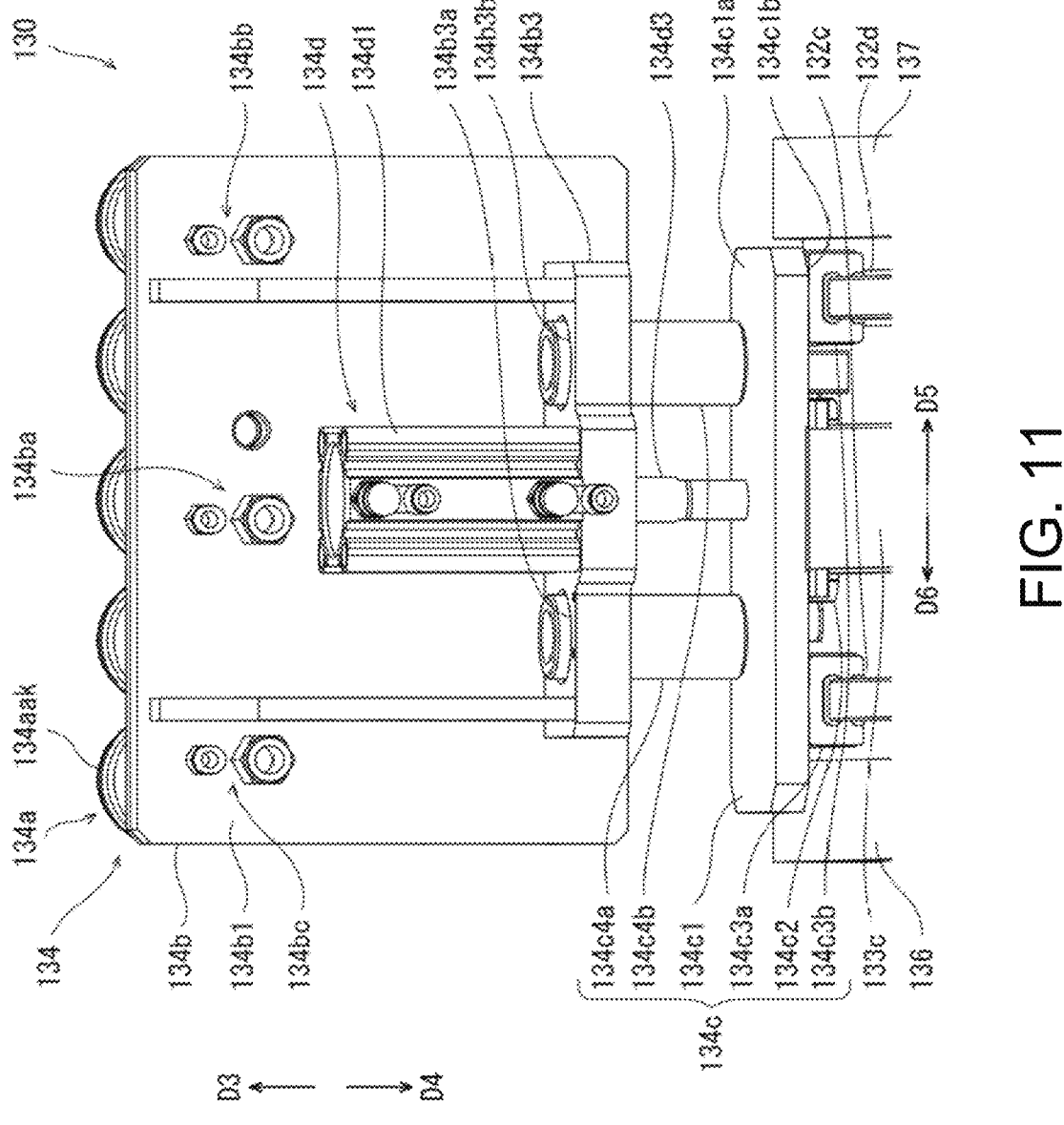
FIG. 11 is a back view of the holder illustrated in FIG. 9, in a state where the lifter is expanded.

FIG. 10 is a cross-sectional side view of the robot hand 130 illustrated in FIG. 7, in a state where the lifter 134*d* is expanded. FIG. 11 is a back view of the holder 134 illustrated in FIG. 9, in the state where the lifter 134*d* is expanded.

As illustrated in FIGS. 7 and 10, the lifter 134*d* includes a cylinder 134*d*1 and a piston 134*d*2 inside the cylinder 134*d*1. The cylinder 134*d*1 is fixed to the supporting body guide 134*b*3, and the piston 134*d*2 is fixed to the base plate 134*c*1 through a rod 134*d*3. The piston 134*d*2 divides an internal space of the cylinder 134*d*1 into a first chamber 134*d*4 located on the third direction D3 side of the piston 134*d*2 and a second chamber 134*d*5 located on the fourth direction D4 side of the piston 134*d*2. The chambers 134*d*4 and 134*d*5 are connected to the negative pressure generator 180 through piping systems 184 and 185 (not illustrated), respectively. The negative pressure generator 180 sends in or sucks air to change the relation of air pressure inside the chambers 134*d*4 and 134*d*5, and move the cylinder 134*d*1 with respect to the piston 134*d*2 in the direction D3 or D4.

As illustrated in FIG. 9, by the lifter 134*d* contracting to move the cylinder 134*d*1 in the fourth direction D4, the supporting body 134*b* is moved in the fourth direction D4 and brought to near the transferring surface 133*c*1. As illustrated in FIG. 11, by the lifter 134*d* expanding to move the cylinder 134*d*1 in the third direction D3, the supporting body 134*b* is moved in the third direction D3 and brought away from the transferring surface 133*c*1. The ascending and descending direction of the lifter 134*d* is not limited to the directions D3 and D4 perpendicular to the transferring surface 133*c*1, but may be a direction intersecting with the transferring surface 133*c*1.

[Imaging Device]

The image capture 400 captures an image of the article A which is a target to be processed by the robot 100. As illustrated in FIGS. 3 and 8, although the image capture 400 is disposed at the robot hand 130 (in detail, the attachment base part 131), it may be disposed at any location as long as it can capture the image of the article A which is the processing target. The image capture 400 includes a camera 401 which captures an image for detecting a three-dimensional (3D) position etc., of a to-be-imaged object with respect to the image capture 400 (e.g., a distance to the to-be-imaged object), and a light source 402 which illuminates the to-be-imaged object.

For example, the camera 401 is a camera which captures a digital image, and may have a configuration of, for example, a stereo camera, a monocular camera, a TOF camera (Time-Of-Flight Camera), a pattern light projection camera, such as a stripe projection, or a camera using an light-section method. The light source 402 is, for example, an LED (Light Emitting Diode) or an electronic flash. The camera 401 and the light source 402 are directed in the second direction D2. The image capture 400 may detect, based on the captured image of the article A, the 3D position and posture (orientation) of the article A and output it to the controller 300, or may output the image to the controller 300 and the controller 300 may calculate the 3D position and posture.

[Input Device]

The input device 200 illustrated in FIG. 1 accepts an input of a command, information, etc., from a user who administrates the robot system 1, and outputs the command, the information, etc., to the controller 300. The input device 200 is connected to the controller 300 through a wired communication or a wireless communication. The wired communication and the wireless communication may have any form. For example, the input device 200 may accept an input of information for identifying a configuration of the article A to be processed by the robot 100 (e.g., a type, the shape, the size, and a standard of the article A). Although the configuration of the input device 200 is not particularly limited, in this embodiment, the input device 200 is a terminal device including a button, a key and/or a touch panel.

[Configuration of Control Device]

Figure 12:
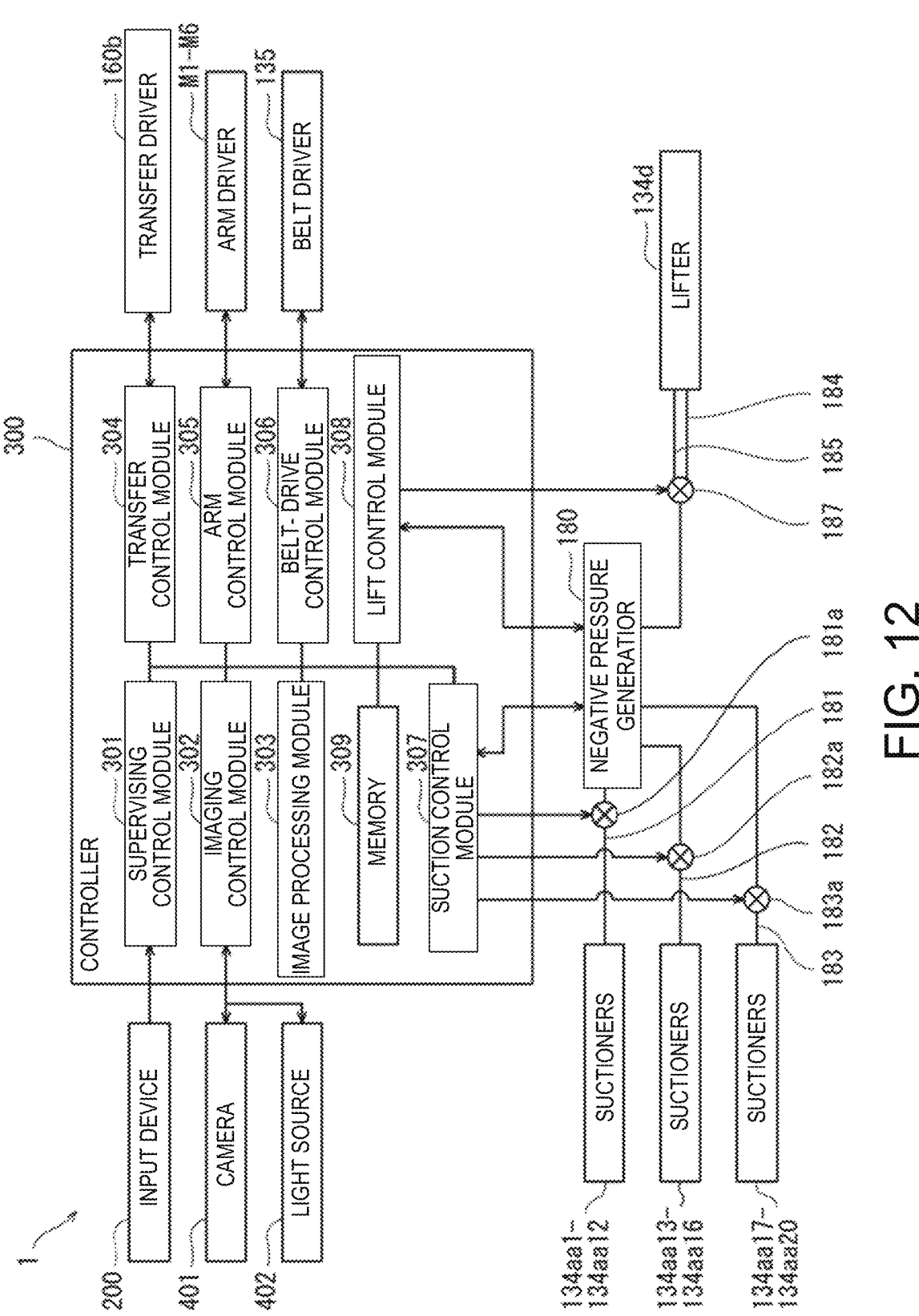
FIG. 12 is a block diagram illustrating one example of a functional configuration of a controller according to this embodiment.

FIG. 12 is a block diagram illustrating one example of a functional configuration of the controller 300 according to this embodiment. As illustrated in FIG. 12, the controller 300 includes, as functional components, a supervising control module 301, an imaging control module 302, an image processing module 303, a transfer control module 304, an arm control module 305, a belt-drive control module 306, a suction control module 307, a lift control module 308, and a memory 309.

The function of the functional components of the controller 300, except for the memory 309, may be implemented by a computer system including, for example, a CPU (Central Processing Unit), a ROM (Read Only Memory), and a RAM (Random Access Memory), may be implemented by a dedicated hardware circuit, such as an electric circuit or an integrated circuit, or may be implemented by a combination of the computer system and the hardware circuit.

For example, the CPU is a processor, and controls the entire processing and operation of the robot system 1. The ROM includes a nonvolatile semiconductor memory etc., and stores a program and data for causing the CPU to control of the processing and operation. The RAM includes a volatile semiconductor memory etc., and temporality stores the program executed by the CPU, under processing or processed data, etc. For example, the program for the operation of the CPU is stored in the ROM etc., in advance. The CPU reads the program from the ROM to the RAM, and develops the program. The CPU executes each command coded in the developed program in the RAM.

The function of the memory 309 is implemented by a memory which is a storage device, such as a semiconductor memory (e.g., a volatile semiconductor memory and a nonvolatile semiconductor memory), an HDD (Hard Disc Drive), and an SDD (Solid State Drive).

The controller 300 may be provided with the CPU, the ROM, the RAM and/or the hardware circuit, and the memory (e.g., the semiconductor memory, the HDD, and the SDD) as hardware.

The supervising control module 301 receives the input of the command etc., from the input device 200, and outputs the command to each of the other functional components according to the input and the program. The supervising control module 301 acquires information on the operation from each of the other functional components, and uses the acquired information to cause the other functional components to operate coordinately, cooperatively and/or collaboratively with each other. The supervising control module 301 can operate at least one of the devices among the camera 401, the light source 402, the transfer driver 160*b*, the arm drivers M1-M6, the belt driver 135, the negative pressure generator 180, the suctioners 134*aa*1-134*aa*20, and the lifter 134*d*, while operating at least one another device.

The memory 309 stores various information, and allows a read-out of the stored information. The memory 309 stores, as a template, information on a configuration (e.g., the type, shape, size, and standard) of the article which may be processed by the robot 100. The memory 309 may store, for example, map information, such as a work site, the image captured by the camera 401, and the program.

The imaging control module 302 controls operation of the camera 401 and the light source 402 of the image capture 400. For example, the imaging control module 302 may cause the camera 401 to capture an image at a given timing, for example, immediately before the robot 100 starts the transferring of the article A. The imaging control module 302 may cause the light source 402 to light up at a timing when the camera 401 captures the image.

The image processing module 303 uses the image captured by the camera 401 and the template of the article stored in the memory 309 to extract the article A shown in the image, and detects the 3D position, posture, etc., of the article A with respect to the camera 401. For example, the image processing module 303 outputs the 3D position and posture to the arm control module 305. The controller 300 controls the robot 100 based on the 3D position and posture of the article A.

The transfer control module 304 controls operation of the transfer driver 160*b*. The transfer control module 304 controls the operation of the transfer driver 160*b* according to the command etc. received from the input device 200 to cause the transfer vehicle 160 to operate correspondingly.

For example, the transfer control module 304 may move the transfer vehicle 160 based on the information received from the image processing module 303, and control the position of the robot 100 with respect to the article A. The transfer control module 304 may acquire information on an operating amount (e.g., a rotating amount) of the servomotor from the transfer driver 160*b*, and may detect the position and direction of the transfer vehicle 160 based on the operating amount. Further, the transfer vehicle 160 may be provided with a position detecting device, such as a GPS (Global Positioning System) receiver, and an IMU (Inertial Measurement Unit). The transfer control module 304 may use a reception signal of the GPS receiver, or an acceleration, an angular velocity, etc., which are measured by the IMU, to detect the position and direction of the transfer vehicle 160. For example, the transfer control module 304 may detect weak inductive current from an electrical wire buried under the floor surface, and detect the position and direction of the transfer vehicle 160 based on the detected value.

The arm control module 305 controls operations of the arm drivers M1-M6. The arm control module 305 controls the arm drivers M1-M6 based on the detection result of the image processing module 303 etc., to cause the robotic arm 120 to operate corresponding to the transferring work of the article A. Further, the arm control module 305 acquires the information on operating amounts (e.g., rotating amounts) of the servomotors of the arm drivers M1-M6, and detects, based on the operating amounts, positional and postural information including positions, postures, moving directions, moving speeds, and moving accelerations of the respective links of the robotic arm 120 and the robot hand 130. The arm control module 305 outputs the positional and postural information to the belt-drive control module 306, the suction control module 307, the lift control module 308, etc. Further, the arm control module 305 uses the positional and postural information as feedback information to control the operations of the arm drivers M1-M6 such that the position and posture of the robot hand 130 become a target position and a target posture.

The belt-drive control module 306 controls operation of the belt driver 135. The belt-drive control module 306 controls, based on the 3D position and posture of the article A which is the transfer target, and the positional and postural information of the robot hand 130, the servomotor 135*a* of the belt driver 135 to move the holder 134 in the direction D1 or D2.

Figure 13:
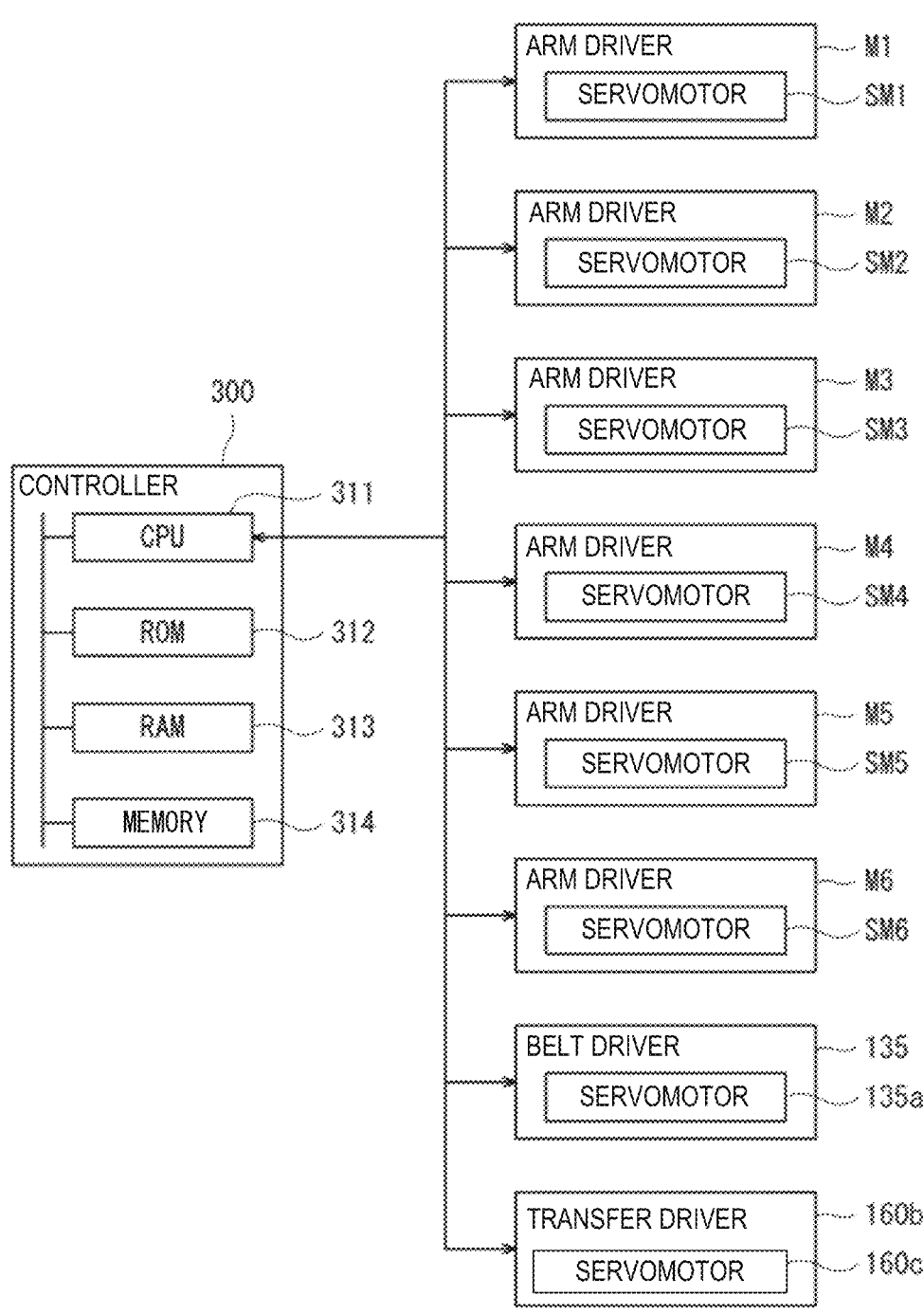
FIG. 13 is a block diagram illustrating one example of a configuration of a CPU of the controller and servomotors according to this embodiment.

Here, each servomotor is provided with an electric motor, an encoder which detects a rotational angle of a rotor of the electric motor, and a current sensor which detects a current value of the electric motor. The controller 300 includes at least one CPU (i.e., a processor), a ROM 312, a RAM 313, and a memory 314. As illustrated in FIG. 13, in this embodiment, a single CPU 311 among the at least one CPU controls the operations of servomotors SM1 to SM6 of the arm drivers M1 to M6, the servomotor 135*a* of the belt driver 135, and a servomotor 160*c* of the transfer driver 160*b*. FIG. 13 is a block diagram illustrating one example of a configuration of the CPU 311 of the controller 300, and the servomotors SM1-SM6, 135*a*, and 160*c* according to this embodiment.

Each of the servomotors SM1-SM6, 135*a*, and 160*c* operates the electric motor according to the command etc., outputted from the CPU 311, and outputs the detection values of the encoder and the electric current sensor to CPU 311. The CPU 311 detects, based on the detection values of the encoder and the electric current sensor which are fed back from each of the servomotors SM1-SM6, 135*a*, and 160*c*, a rotating amount, a rotational speed, a rotational torque, etc., of the rotor of the electric motor, and uses the detection result to control a rotation start timing, a rotation stop timing, the rotational speed, the rotational torque, etc., of the electric motor.

Accordingly, the CPU 311 can cause each of the servomotors SM1-SM6, 135*a*, and 160*c* to stop at an arbitrary rotational position, rotate at an arbitrary rotational speed, and operate at an arbitrary rotational torque. Therefore, the CPU 311 can cause the robotic arm 120, the belt driving mechanism 133, the transfer vehicle 160, etc., to operate variously and finely.

The single CPU 311 integrally controls driving at at least eight axes, including driving at six axes corresponding to the servomotors SM1-SM6, and driving at at least two axes corresponding to the servomotors 135*a* and 160*c*. The axes corresponding to the servomotors 135*a* and 160*c* may be referred to as "external axes." The single CPU 311 may also integrally control driving of other servomotors provided to the robot hand 130, opening-and-closing devices 181*a*-183*a* (described later) which drive the suctioners 134*aak*, a switching device 187 (described later) which drives the lifter 134*d*, and the negative pressure generator 180, together with the driving at the at least eight axes. According to this, the CPU 311 can cause the devices to smoothly operate while cooperating with each other.

The suction control module 307 controls operation of the suctioners 134*aak*. In detail, the suction control module 307 controls the operations of the negative pressure generator 180 and the opening-and-closing devices 181*a*-183*a*. The opening-and-closing device 181*a* is provided to the first piping system 181, and connects or disconnects (intercepts) the first piping system 181. The opening-and-closing device 182*a* is provided to the second piping system 182, and connects or disconnects the second piping system 182. The opening-and-closing device 183*a* is provided to the third piping system 183, and connects or disconnects the third piping system 183. The suction control module 307 operates the negative pressure generator 180 and conducts it to each of the opening-and-closing devices 181*a*-183*a* so as to generate negative pressure at each of the suctioner groups G1-G3. Each of the opening-and-closing devices 181*a*-183*a* is, for example, an on-off valve including a solenoid valve.

The lift control module 308 controls operation of the lifter 134*d*. In detail, the lift control module 308 controls the operations of the negative pressure generator 180 and the switching device 187. The switching device 187 is provided to the piping systems 184 and 185 which communicate with the chambers 134*d*4 and 134*d*5 (see FIG. 10) of the lifter 134*d*, respectively.

The switching device 187 can switch the communication between the communication of the fourth piping system 184 with the negative pressure generator 180, and the communication of the fifth piping system 185 with the negative pressure generator 180. Further, the switching device 187 may intercept both of the communications. By the lift control module 308 operating the negative pressure generator 180 and causing the switching device 187 to switch the communication, the pressure inside the chamber 134*d*4 or 134*d*5 is increased or decreased, and the lifter 134*d* is expanded or contracted. The switching device 187 is, for example, a switching valve including a solenoid valve.

<First Operation of Robot System>

Figure 14:
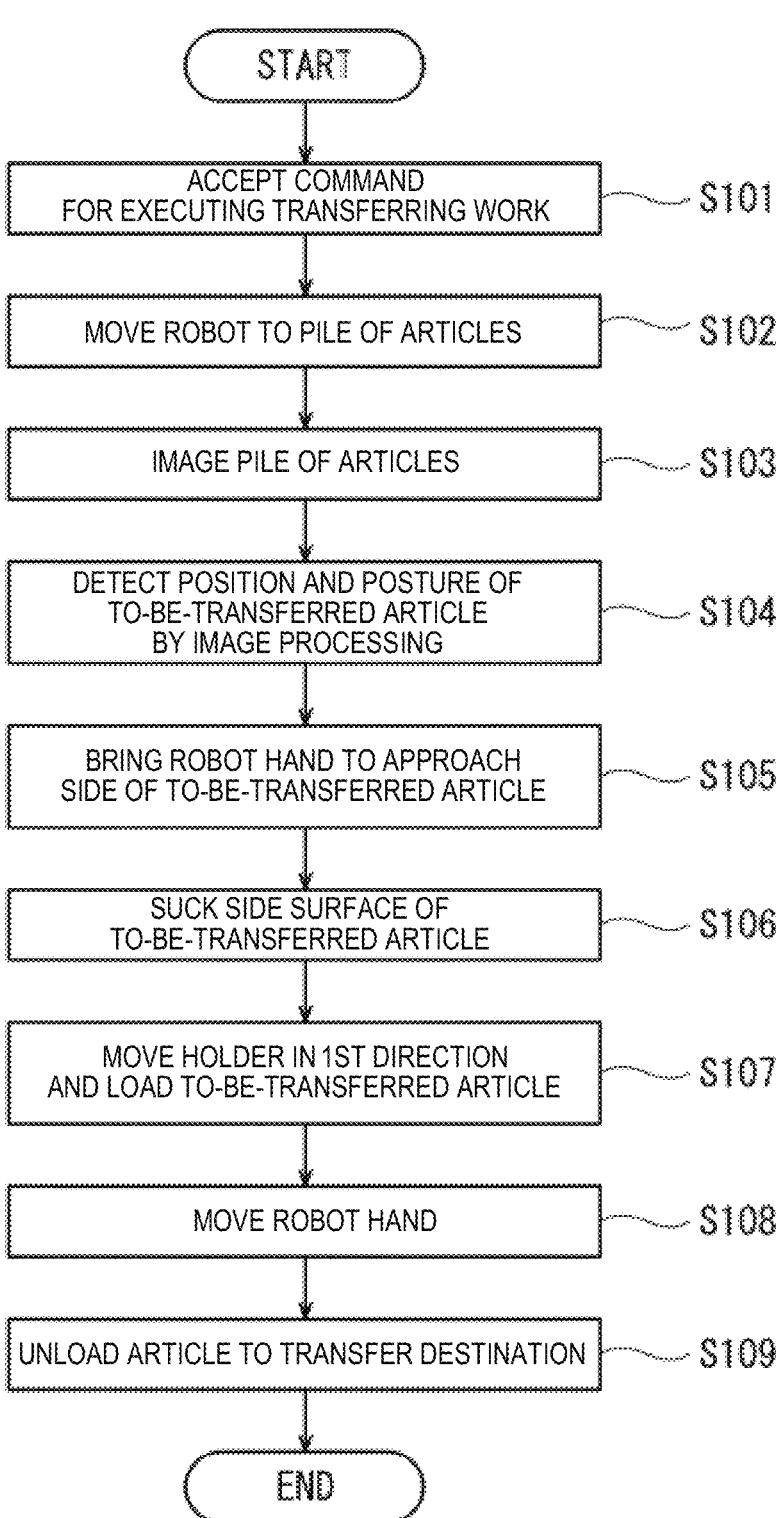
FIG. 14 is a flowchart illustrating one example of a first operation of the robot system according to this embodiment.
Figure 15:
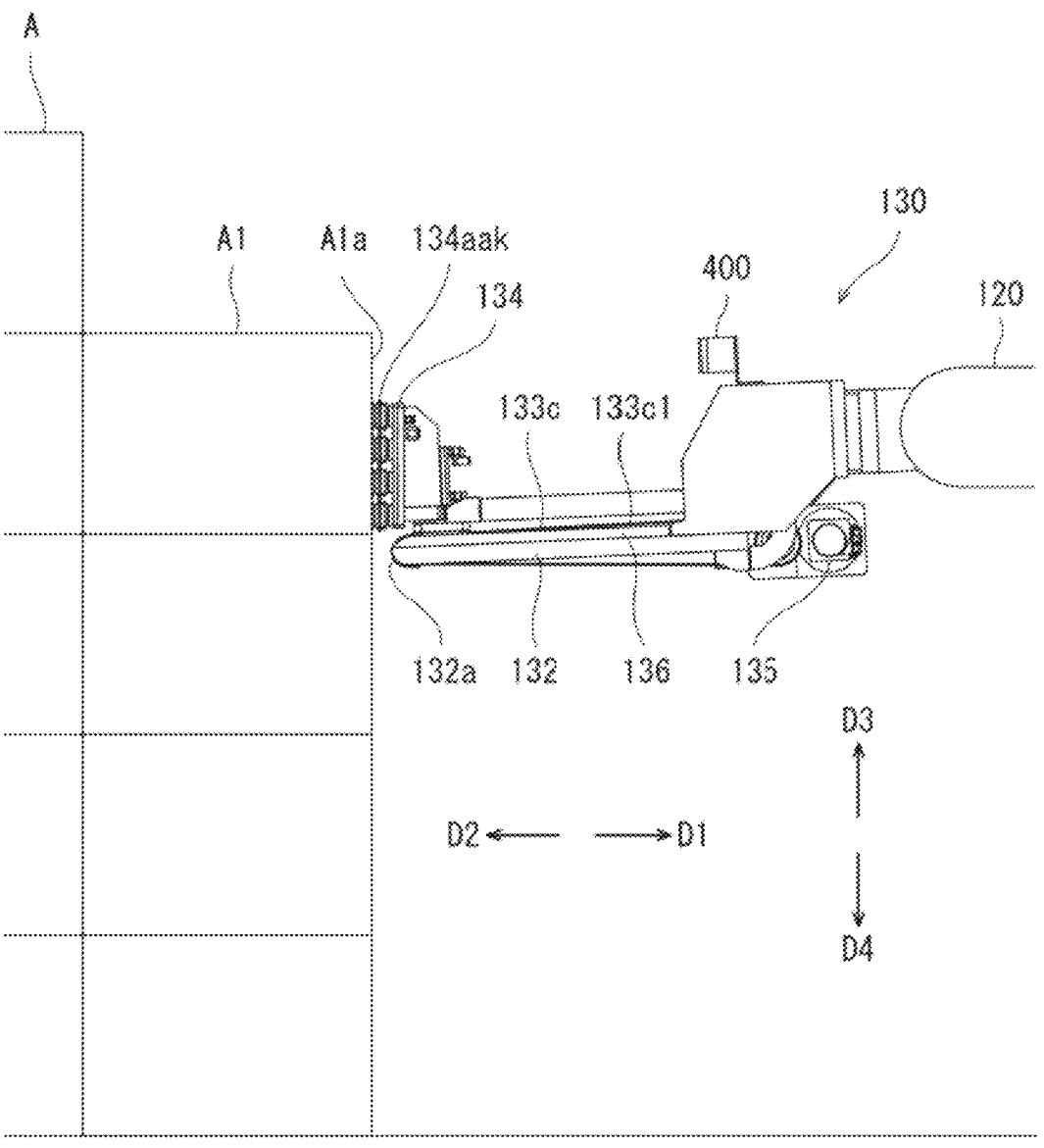
FIG. 15 is a side view illustrating one state in the first operation of the robot system according to this embodiment.
Figure 16:
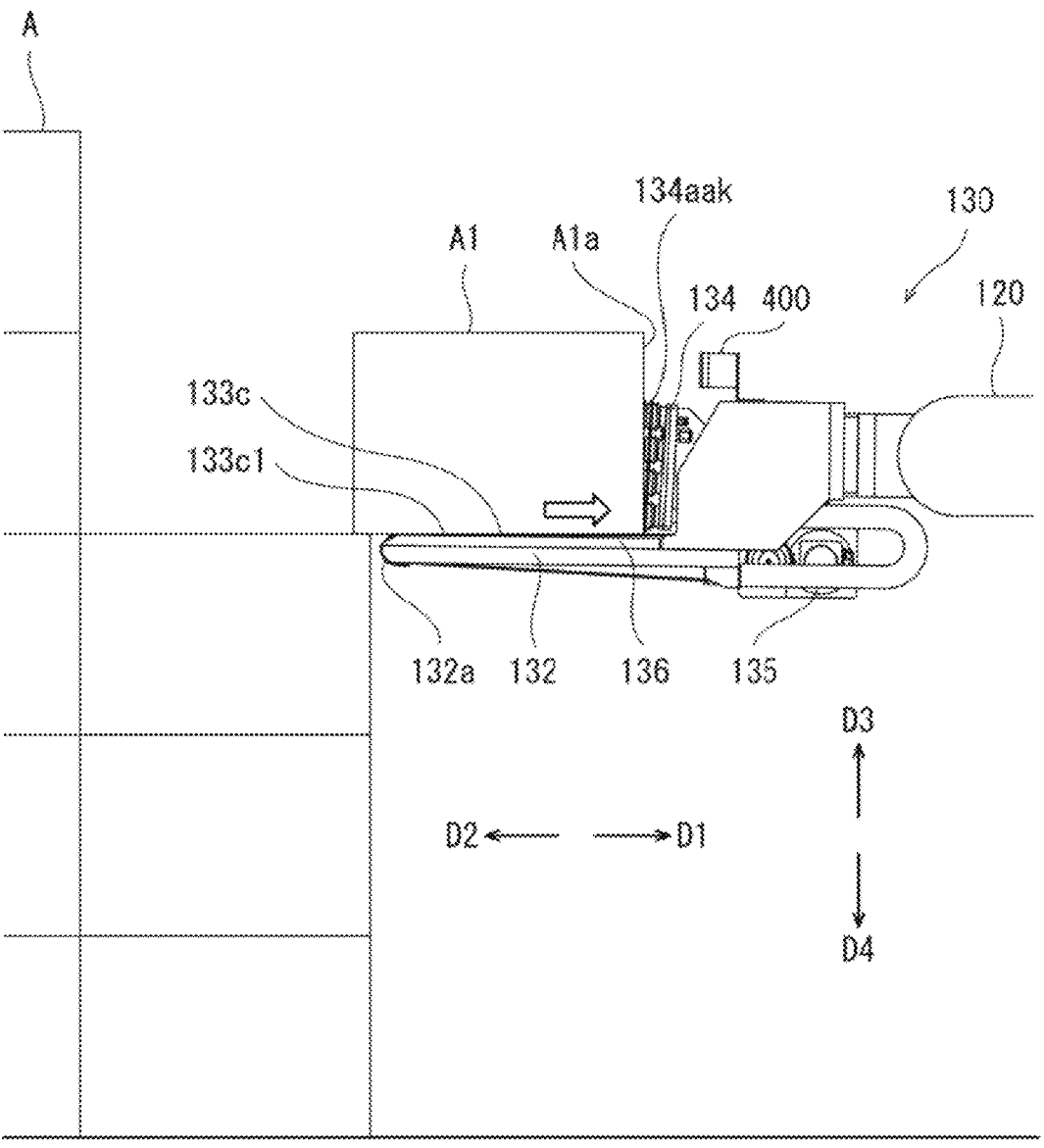
FIG. 16 is a side view illustrating one state in the first operation of the robot system according to this embodiment.

A first operation of the robot system 1 is described with reference to FIG. 14. FIG. 14 is a flowchart illustrating one example of the first operation of the robot system 1 according to this embodiment. FIGS. 15 and 16 are side views each illustrating one state in the first operation of the robot system 1 according to this embodiment.

The first operation is an operation to transfer, by using the robot hand 130, an article A1 existing at a location upwardly away from a placing surface (e.g., a floor surface). The article A1 is located at a height where the base 132 of the robot hand 130 can be placed below the article A1, and, for example, placed on another article A. In this embodiment, the robot system 1 transfers the article A1 located at the top of a pile of articles A which are piled up in a row in an up-and-down direction. The first operation is a fully automatic operation, and the robot system 1 autonomously detects the 3D position and posture of the article A1 etc., by using the image capture 400, and causes the robot 100 to execute each operation based on the detection result.

At Step S101, as illustrated in FIG. 1, the user who administrates the robot system 1 inputs into the input device 200 the command for executing the transferring work, and the controller 300 accepts the command. The command includes a location of the pile of the piled-up articles A which are the transfer targets, and a location of a transfer destination (e.g., a belt conveyor) of the article A. The command includes a configuration of the article A.

Next, at Step S102, the controller 300 operates the transfer vehicle 160 according to the command received from the input device 200, and moves the robot 100 to a location near the pile of articles A. The controller 300 may use map information stored in the memory 309.

Next, at Step S103, the controller 300 causes the image capture 400 to image the pile of articles A. The controller 300 changes the position and posture of the robot hand 130 as necessary in order to capture the image.

Next, at Step S104, the controller 300 performs image processing to the image captured by the image capture 400 to detect the 3D position, posture, etc., of the article A1 to be transferred. For example, the controller 300 extracts from the memory 309 a template corresponding to the configuration of the article A, and uses the template to detect the article A shown in the image. For example, a method of pattern matching with the template may be used for the detection. Moreover, the controller 300 detects the article A1 at the top of the piled-up articles A, as the transfer target. The controller 300 applies the stereo processing to the image so as to detect the 3D position and posture of the article A1 and the size, etc. of the article A1.

Next, at Step S105, as illustrated in FIG. 15, the controller 300 operates the robotic arm 120 based on the 3D position and posture, etc., of the article A1 to move the robot hand 130 to approach a side of the article A1. The controller 300 causes the robot hand 130 to approach the article A1 from the side in the horizontal direction. At this time, the controller 300 causes the suctioners 134_aak_ to approach a side surface Ala of the article A1, which is oriented horizontally one side, from the side such that the suctioners 134_aak_ face the side surface Ala.

In this process, the controller 300 moves the holder 134 of the robot hand 130 to the endmost position in the second direction D2 within a movable range. According to this, the suctioners 134_aak_ project in the second direction D2 more than the end 132_a_ of the base 132 of the robot hand 130, and easily contacts the side surface Ala. Further, the controller 300 controls the posture of the robot hand 130 so that the holder 134 is positioned higher than the base 132. Moreover, the controller 300 controls the position and posture of the robot hand 130 so that the upper surfaces 136_a_ and 137_a_ of the sliding members 136 and 137 of the base 132 (see FIG. 3) are substantially horizontal and positioned lower than the article A1.

The controller 300 may execute the positional control of the robot hand 130, the posture control of the robot hand 130, and the motion control of the holder 134 in parallel with each other so that at least a part of the controls overlap, or may execute the controls separately in order.

Next, at Step S106, the controller 300 causes the suctioners 134_aak_ to suck the side surface Ala of the article A1. The controller 300 causes the suctioners 134_aak_ to generate negative pressure, and brings the suctioners 134_aak_ to near or in contact with the side surface Ala. In detail, the controller 300 determines, based on the size of the article A1, the suctioner group at which negative pressure is generated, among the suctioner groups G1-G3. In the example of FIG. 15, the size of the side surface Ala of the article A1 is large enough so that the entire suctioners 134_aak_ contact therewith, and thus, the controller 300 causes all of the suctioner groups G1-G3 to generate negative pressure. The controller 300 actuates the negative pressure generator 180 and conducts it to the opening-and-closing devices 181_a_-183_a_ so as to cause the suctioner groups G1-G3 to suck the side surface Ala. For example, when the article A has a small side surface with which the suctioner groups G2 and G3 cannot contact, the controller 300 causes only the first suctioner group G1 to generate negative pressure.

Next, at Step S107, as illustrated in FIG. 16, the controller 300 moves the holder 134 in the first direction D1 with respect to the base 132 to pull out the article A1 sidewardly from the pile of articles A and place the article A1 on the robot hand 130. In detail, the controller 300 determines completion of the suction by the suctioners 134_aa_1-134_aa_20 based on information about, for example, a rise in a load in the negative pressure generator 180, and a rise in a negative pressure value detected by a pressure sensor (not illustrated) provided to the piping systems 181-183. After the completion of the suction, the controller 300 actuates the belt driver 135 to drive the driving belt 133_c_. The driving belt 133_c_ moves the holder 134 as well as the transferring surface 133_c_1 in the first direction D1, and the holder 134 and the suctioners 134_aa_1-134_aa_20 pull out the article A1 in the first direction D1 so that the article A1 is placed on the sliding members 136 and 137 and the transferring surface 133_c_1. Then, the article A1 is moved further in the first direction D1 by both of the transferring surface 133_c_1 and the holder 134. The article A1 smoothly slides on the upper surfaces 136_a_ and 137_a_ of the sliding members 136 and 137.

Next, at Step S108, the controller 300 moves the robot hand 130 to remove the article A1 from the pile of articles A. In detail, the controller 300 stops the belt driver 135 when the holder 134 reaches the endmost position in the first direction D1 within the movable range, and moves the robot hand 130 in the direction away from the pile of articles A. Further, the controller 300 moves the robot hand 130 to the transfer destination of the article A1. Although in this embodiment the controller 300 keeps sucking by the suctioners 134_aa_1-134_aa_20 until the robot hand 130 reaches the transfer destination, the sucking may be suspended at any timing after the stopping of the belt driver 135.

Next, at Step S109, the controller 300 unloads the article A1 from the robot hand 130 after the arrival at the transfer destination. In detail, the controller 300 actuates the belt driver 135. The driving belt 133_c_ moves the holder 134 in the second direction D2 as well as the transferring surface 133_c_1, and the holder 134 pushes the article A1 in the second direction D2. The article A1 is moved in the second direction D2 by the transferring surface 133c1 and the holder 134, and unloaded from the sliding members 136 and 137.

<Second Operation of Robot System>

Figure 17:
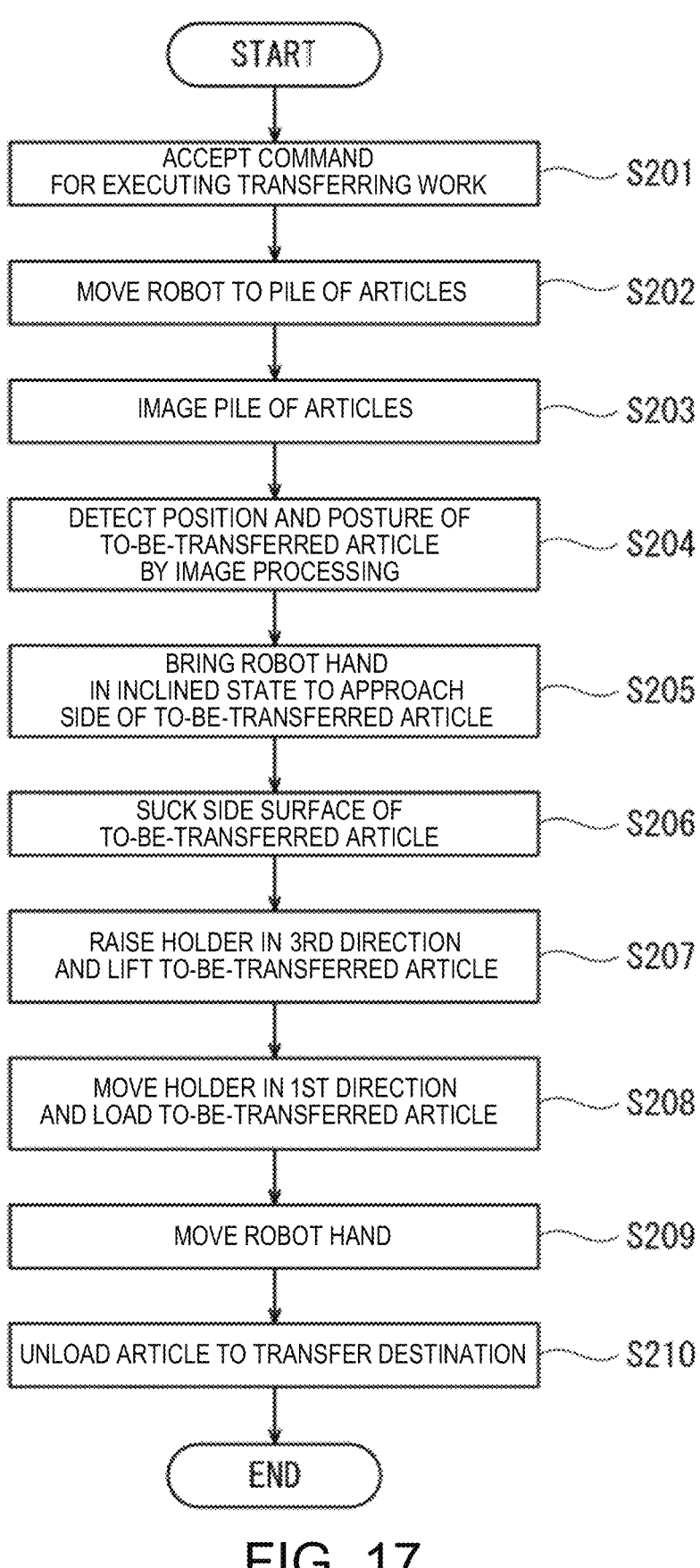
FIG. 17 is a flowchart illustrating one example of a second operation of the robot system 1 according to this embodiment.
Figure 18:
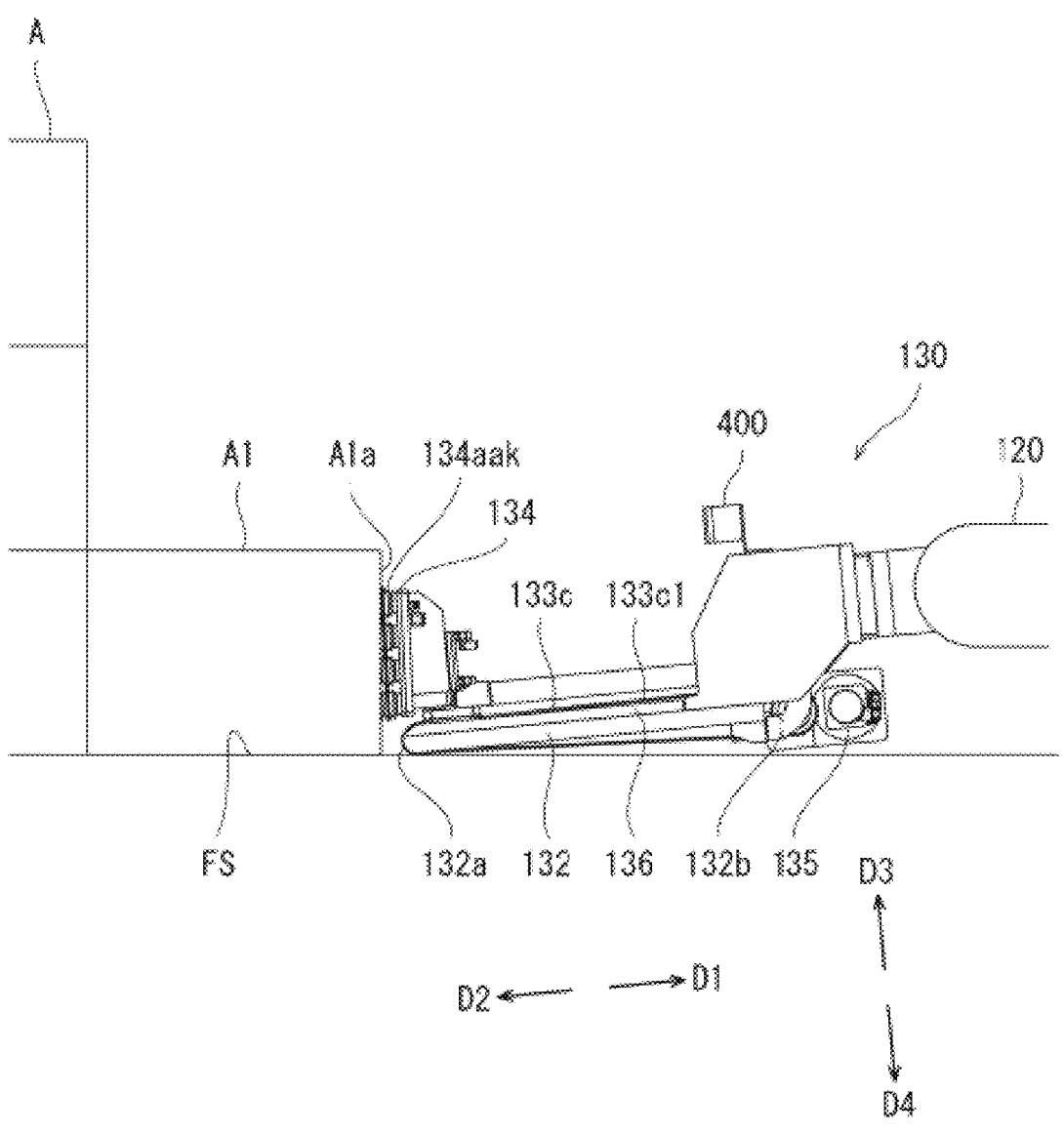
FIG. 18 is a side view illustrating one state in the second operation of the robot system 1 according to this embodiment.
Figure 19:
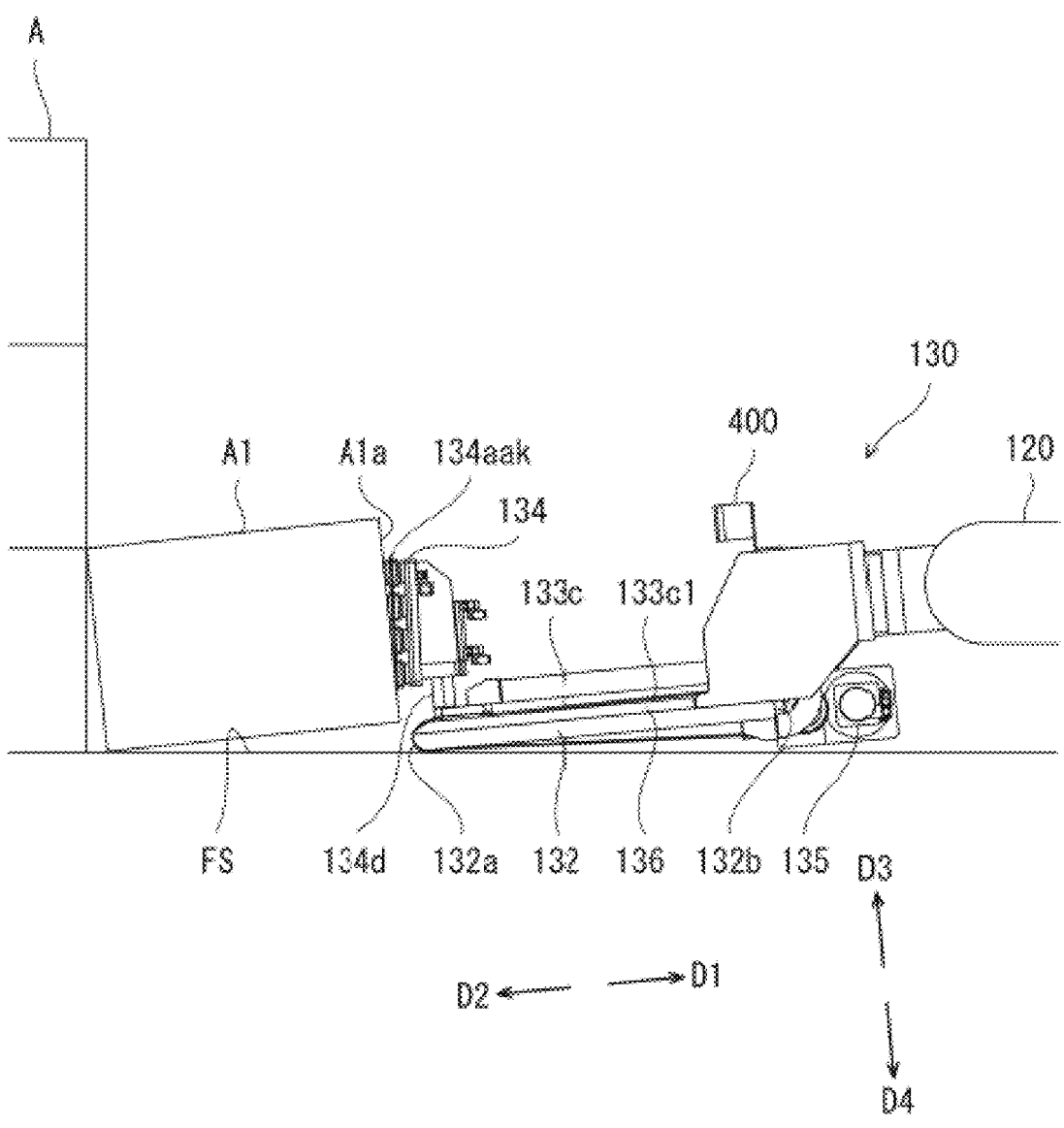
FIG. 19 is a side view illustrating one state in the second operation of the robot system 1 according to this embodiment.
Figure 20:
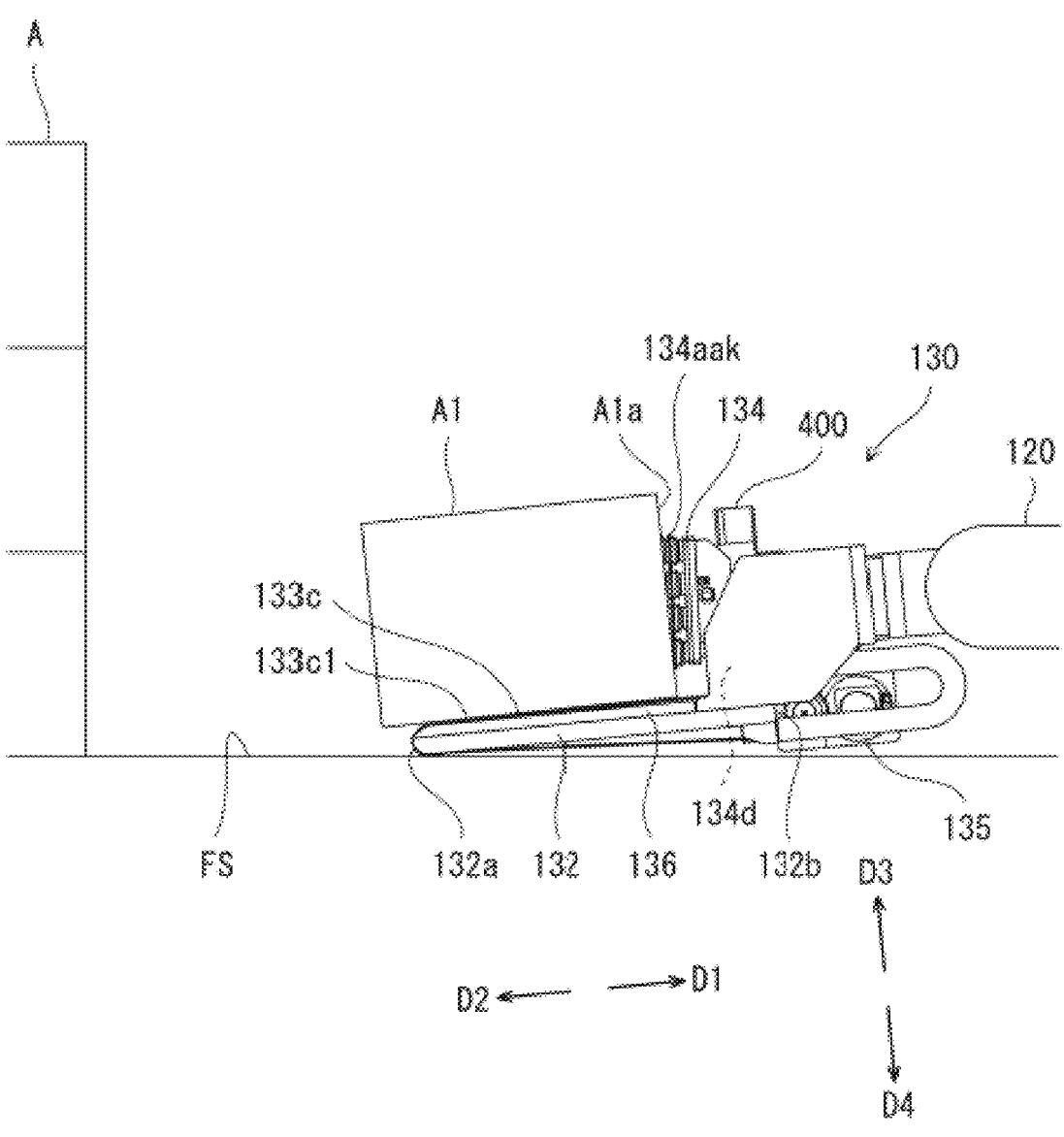
FIG. 20 is a side view illustrating one state in the second operation of the robot system 1 according to this embodiment.

A second operation of the robot system 1 is described with reference to FIG. 17. FIG. 17 is a flowchart illustrating one example of the second operation of the robot system 1 according to this embodiment. FIGS. 18 to 20 are side views each illustrating one state in the second operation of the robot system 1 according to this embodiment.

The second operation is an operation to transfer the article A1 placed directly on the placing surface (e.g., the floor surface) by using the robot hand 130. The article A1 is located at a height where the base 132 of the robot hand 130 cannot be placed below the article A1. In this embodiment, the robot system 1 transfers the article A1 located at the lowest without other articles A being place thereon. The second operation is also a fully automatic operation.

Steps S201-S204 are similar to Steps S101-S104 of the first operation. At Step S204, the controller 300 performs the image processing to the image captured by the image capture 400 so as to detect one article A at the lowest among the piled-up articles A as the article A1, and detects the 3D position and posture, the size, etc. of the article A1.

Next, at Step S205, as illustrated in FIG. 18, the controller 300 causes, based on the 3D position and posture, etc., of the article A1, the robot hand 130 to approach a side of the side surface A1a of the article A1 while taking a first posture which is an inclined state, and causes the suctioners 134aak to approach the side surface A1a while facing thereto. Further, the controller 300 brings the end 132a of the base 132 to near a floor surface FS which is the placing surface of the article A1. In the first posture, the holder 134 is at the position higher than the base 132 and the endmost in the second direction D2. In the first posture, the upper surfaces 136a and 137a of the sliding members 136 and 137, and the transferring surface 133c1 are inclined to be away from the floor surface FS with distance from the article A1, and the end 132b of the base 132 is farther from the floor surface FS than the end 132a.

The controller 300 may execute the positional control of the robot hand 130, the posture control of the robot hand 130, and the motion control of the holder 134 in parallel with each other so that at least a part of the controls overlap, or may execute the controls separately in order.

Next, at Step S206, the controller 300 causes the suctioners 134aak to suck the side surface A1a of the article A1. Similarly to Step S106 of the first operation, the controller 300 causes the suctioner groups G1-G3 determined based on the size of the article A1 to suck.

Next, at Step S207, as illustrated in FIG. 19, the controller 300 raises the holder 134 in the third direction D3 to lift at least a part of the article A1 from the floor surface FS. In detail, after the completion of sucking, the controller 300 actuates the lifter 134d and expands it so that the holder 134 is moved in the third direction D3 with respect to the base 132. The holder 134 and the suctioners 134aa1-134aa20 upwardly pull the side surface A1a to lift the article A1. By the expansion of the lifter 134d, a bottom surface of the article A1 near the side surface A1a is lifted to be positioned higher than the upper surfaces 136a and 137a of the sliding members 136 and 137, and the transferring surface 133c1. The entire article A1 may be lifted up.

Next, at Step S208, as illustrated in FIG. 20, after the completion of the expansion of the lifter 134d, similarly to Step S107 of the first operation, the controller 300 moves the holder 134 in the first direction D1 to sidewardly pull out the article A1. Since the bottom surface of the article A1 is lifted up, the holder 134 can smoothly place the article A1 on the sliding members 136 and 137. Steps S209 and S210 are similar to Steps S108 and S109 of the first operation.

The controller 300 may carry out the first operation and the second operation in combination. For example, the controller 300 may repeatedly execute Steps S103-S109 of the first operation, and Steps S203-S210 of the second operation so as to sequentially transfer the article A of the piled-up articles A automatically.

Effects Etc

The robot hand 130 according to this embodiment as described above is provided with the holder 134 which moves the article A in the first direction D1 while holding the article A, the driving belt 133c which has the transferring surface 133c1 on which the article A is placed, and drives the transferring surface 133c1 to move in the first direction D1, and the belt driver 135 which drives the driving belt 133c. The holder 134 moves in the first direction D1 to place the held article A onto the transferring surface 133c1.

According to this configuration, the holder 134 can place the article A on the transferring surface 133c1 by moving in the first direction D1 while holding the article A. The article A on the transferring surface 133c1 is pulled on the robot hand 130 further along by the driving belt 133c. The moving directions of the holder 134 and the transferring surface 133c1 are both in the first direction D1, and thus, the robot hand 130 can place the article A thereon by the cooperation of the holder 134 and the driving belt 133c. Moreover, the robot hand 130 is disposed such that the side of the article A is oriented in the first direction D1, thus being capable of approaching the article A from the side and pulling out the article A to the side (first direction D1) to transfer it.

The holder 134 may be fixed to the driving belt 133c to be moved together with the transferring surface 133c1. According to this configuration, the configuration for moving the holder 134 can be simplified. Moreover, the holder 134 and the driving belt 133c can make the same movement to move the article A together.

The holder 134 may be directed to hold the article A existing on the second direction D2 side opposite from the first direction D1. According to this configuration, the holder 134 holds the article A located on the second direction D2 side, and moves the article A while pulling it out to the first direction D1. Therefore, the holder 134 can easily move the article A.

The holder 134 may include the adhesion part 134a which holds the article A by adhering (attaching) to the article A. Moreover, the adhesion part 134a may include the suctioner 134aak which sucks the article A. According to this configuration, the holder 134 can hold the article A while attaching the article A to the adhesion part 134a. Further, by the adhesion part 134a being provided with the suctioner 134aak, the adhesion which has less influence (e.g., damage) on the surface of the article A becomes possible.

The adhesion part 134a may include the suctioners 134aak. The suctioner groups G1-G3 which constitute the suctioners 134aak are connected to the negative pressure generator 180 through the piping systems 181-183, respectively, and may suck the article A by negative pressure generated by the negative pressure generator 180. Furthermore, the negative pressure generator 180 may select at least one of the piping systems 181-183 at which the negative pressure is generated. For example, in any of the suctioner groups G1-G3, when a part of the suctioners 134aak cannot contact the surface of the article A, the entire suctioners 134aak may not be able to generate the effective negative pressure. According to the configuration described above, since the suctioner(s) 134aak which sucks the surface of the article A can be changed according to the size, shape, etc., of the to-be-sucked surface of the article A, the effective sucking is possible.

The suctioners 134aak of the adhesion part 134a may be arrayed in the direction intersecting with the transferring surface 133c1 of the driving belt 133c, and in the direction toward and away from the transferring surface 133c1, and the suctioner 134aak distant from the transferring surface 133c1 may be positioned on the first direction D1 side compared to the suctioner 134aak near the transferring surface 133c1. For example, in the first operation, the robot hand 130 pulls out the article A1 from the pile of articles A in the posture in which the transferring surface 133c1 is substantially perpendicular to the side surface A1a of the article A1. In the second operation, the robot hand 130 pulls out the article A1 in the posture in which the transferring surface 133c1 inclines with respect to the state being perpendicular to the side surface A1a of the article A1. By the suctioners 134aak being disposed as described above, the robot hand 130 can cause many suctioners 134aak to suck the side surface A1a in both of the first and second operations.

The robot hand 130 according to this embodiment may include the lifter 134d which moves the holder 134 in the direction intersecting with the transferring surface 133c1 and the direction toward and away from the transferring surface 133c1 (e.g., the third direction D3 and the fourth direction D4). According to this configuration, the lifter 134d can lift the holder 134 so that at least a part of the bottom surface of the article A held by the holder 134 is located higher than the transferring surface 133c1. Therefore, the movement of the article A to above the transferring surface 133c1 becomes smoother.

The robot 100 according to this embodiment includes the robot hand 130, the robotic arm 120 connected at its end to the robot hand 130, and the controller 300 which controls the operation of the belt driver 135 and the lifter 134d of the robot hand 130, and the operation of the arm drivers M1-M6 of the robotic arm 120. According to this configuration, effects similarly to the robot hand 130 according to this embodiment can be achieved. Further, the robot 100 can use the robotic arm 120 to optimally control the position and posture of the robot hand 130 with respect to the article A.

In the robot 100 according to this embodiment, the belt driver 135 and the arm drivers M1-M6 may include the servomotors, and the controller 300 may control the operations of the servomotors of the belt driver 135 and the arm drivers M1-M6 so as to cooperate with each other. The controller 300 may include at least one processor, and the sole processor may control the operations of the servomotors of the belt driver 135 and the arm drivers M1-M6. According to this configuration, the robot 100 can cooperatively execute operations of, for example, operating the robotic arm 120 while driving the driving belt 133c. Moreover, since the sole processor controls the operations of all the servomotors of the robot hand 130 and the robotic arm 120, the cooperation of the operations of the servomotors can be easily and smoothly realized.

The robot 100 according to this embodiment may include the negative pressure generator 180 connected to the suctioner 134aak of the adhesion part 134a, and the controller 300 may control the operation of the negative pressure generator 180. According to this configuration, the robot 100 can place the article A on the robot hand 130 while sucking the article A by negative pressure.

The robot 100 according to this embodiment may include the image capture 400. Moreover, the controller 300 may estimate the size of the article A based on the image captured by the image capture 400 and showing the article A, and may select, based on the estimated size of the article A, at least one of the piping systems 181-183 to cause the negative pressure generator 180 to generate negative pressure. The piping systems 181-183 may connect the corresponding suctioner groups G1-G3 to the negative pressure generator 180. According to this configuration, the robot 100 can automatically determine the suctioner 134aak at which negative pressure is generated according to the article A based on the image captured by the image capture 400.

The controller 300 of the robot 100 according to this embodiment may control the position and posture of the robot hand 130 with respect to the article A, based on the image captured by the image capture 400 and showing the article A. According to this configuration, the robot 100 can automatically and optimally control the position and posture of the robot hand 130 according to the article A.

<Modification 1>

A robot hand 130A according to Modification 1 is described. The robot hand 130A according to Modification 1 is different from the embodiment in that the robot hand 130A is provided with a moving device 133A which moves the holder 134, separately from the belt driving mechanism 133. Below, Modification 1 is described focusing on the different point from the embodiment, and description similar to the embodiment will suitably be omitted.

Figure 21:
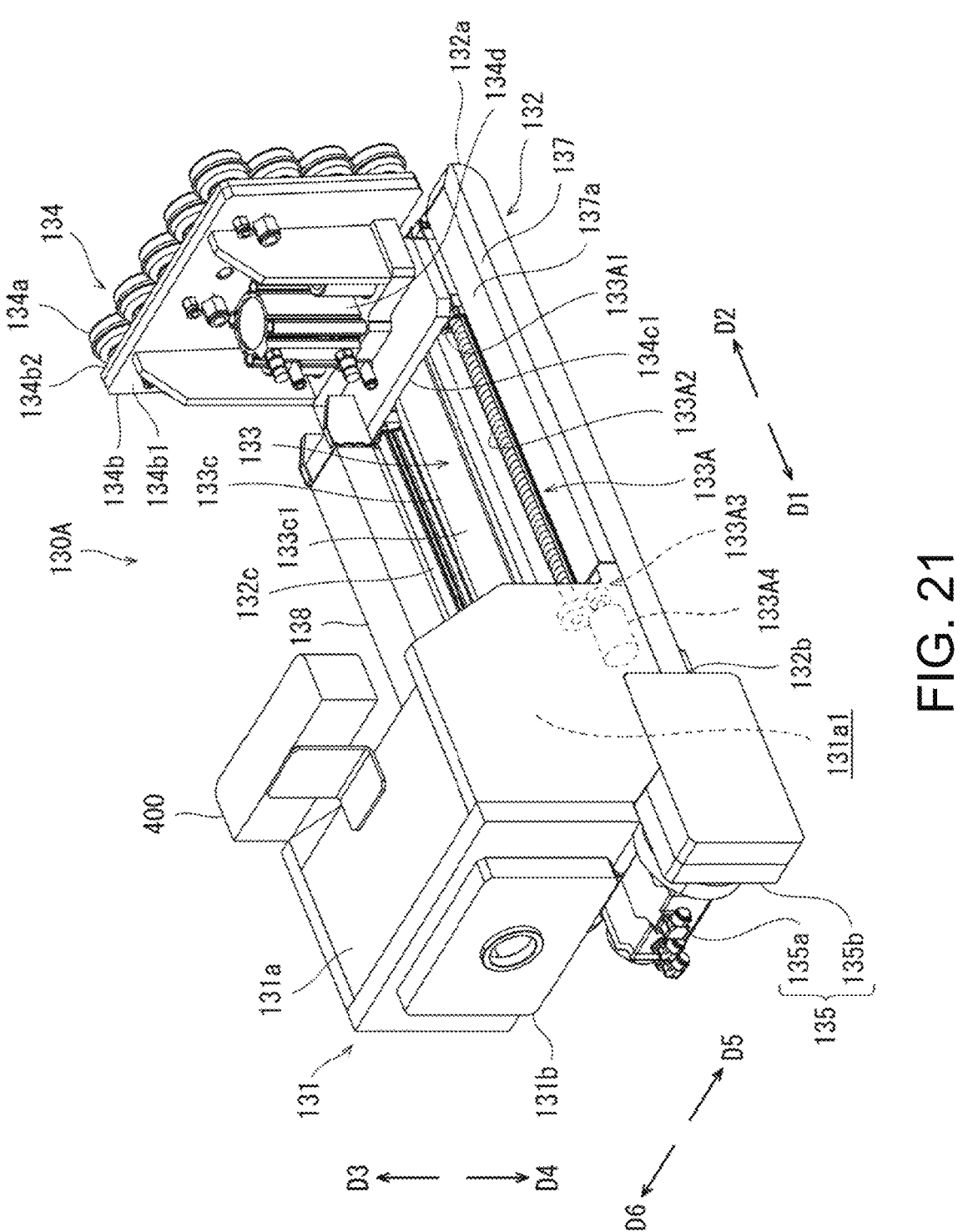
FIG. 21 is a perspective view illustrating one example of a configuration of a robot hand according to Modification 1, similarly to FIG. 4.

FIG. 21 is a perspective view illustrating one example of a configuration of the robot hand 130A according to Modification 1, similarly to FIG. 4. As illustrated in FIG. 21, the robot hand 130A is provided with the moving device 133A of the holder 134, and the holder 134 is not fixed to the driving belt 133c. The moving device 133A is provided with a threaded-hole member 133A1, a threaded rod 133A2, a speed reducer 133A3, and a screw driver 133A4. The moving device 133A is one example of a third driver.

The threaded-hole member 133A1 includes an internally-threaded hole extending in the first direction D1, and is fixed to the base plate 134c1 of the fixing part 134c. The threaded-hole member 133A1 is, for example, a ball nut. In this modification, the sliding guide 134c3b is not provided, but the threaded-hole member 133A1 is disposed at the location of the sliding guide 134c3b.

The threaded rod 133A2 extends in the first direction D1, and is threadedly engaged with the internally-threaded hole of the threaded-hole member 133A1. In this modification, the base guide 132d of the base 132 is not provided, but the threaded rod 133A2 is disposed at the location of the base guide 132d.

The screw driver 133A4 is disposed inside the accommodation space 131a1, and connected to the threaded rod 133A2 via the speed reducer 133A3. The screw driver 133A4 uses electric power as a driving source, includes a servomotor as an electric motor, and is controlled by the controller 300. The speed reducer 133A3 reduces a rotational speed and increases a rotational driving force of the servomotor of the screw driver 133A4, and transmits the increased rotational driving force to the threaded rod 133A2. The screw driver 133A4 can rotary drive the threaded rod 133A2 in a direction of a screw rotation.

The moving device 133A constitutes a screw mechanism, and rotary drives the threaded rod 133A2 by the rotational driving force of the screw driver 133A4, and moves the threaded-hole member 133A1, which is threadedly engaged with the threaded rod 133A2, in the direction D1 or D2 which is an axial direction of the threaded rod 133A2. Accordingly, the moving device 133A moves the holder 134 in the directions D1 and D2.

The robot hand 130A according to Modification 1 as described above can achieve effects similarly to the embodiment. The moving device 133A may be provided at the location of the base guide 132c, or at a location different from the base guides 132c and 132d. Two or more moving devices 133A may be provided. The number and the position of the moving devices 133A may be any number and position. The servomotor 135a of the belt driver 135 may also function as the screw driver 133A4. The moving device 133A is not limited to the screw mechanism, as long as it can move the holder 134 in the directions D1 and D2. For example, the moving device 133A may include, for example, a pneumatic, hydraulic, or electric cylinder, or an electric linear actuator.

<Modification 2>

A robot hand 130B according to Modification 2 is described. The robot hand 130B according to Modification 2 is different from the embodiment and Modification 1 in that a directing device 134B which changes the oriented direction of the adhesion part 134a of the holder 134 is provided. Below, Modification 2 is described focusing on the different point from the embodiment and Modification 1, and description similar to the embodiment and Modification 1 will suitably be omitted.

Figure 22:
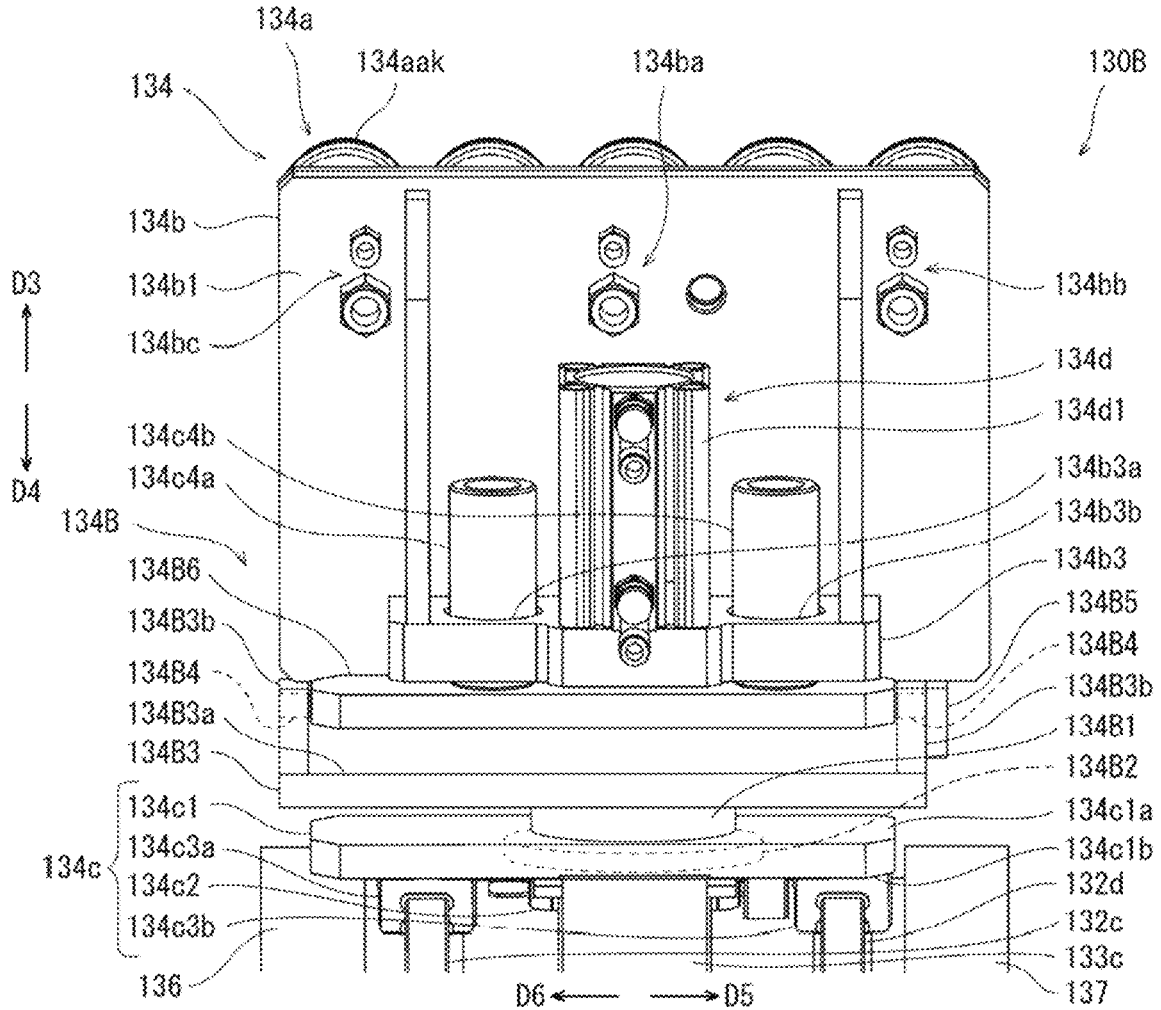
FIG. 22 is a back view illustrating one example of a configuration of a robot hand according to Modification 2, similarly to FIG. 9.

FIG. 22 is a back view illustrating one example of a configuration of the robot hand 130B according to Modification 2, similarly to FIG. 9. As illustrated in FIG. 22, the robot hand 130B is provided with the directing device 134B which is one example of a fifth driver, at the fixing part 134c of the holder 134. The directing device 134B has a gimbal structure with two axes, and can turn the supporting body 134b of the holder 134 in a yaw-direction and a pitch-direction. The yaw-direction is a rotational direction centering on an axis in the third direction D3, and the pitch-direction is a rotational direction centering on an axis perpendicular to the third direction D3.

The directing device 134B includes a yaw rotational shaft 134B1, a yaw-rotation driver 134B2, a pedestal member 134B3, a pitch rotational shaft 134B4, a pitch-rotation driver 134B5, and a support member 134B6.

The yaw rotational shaft 134B1 is a shaft extending in the third direction D3 from the surface 134c1a of the base plate 134c1 of the fixing part 134c so as to be freely rotatable, and its axial-center direction is the third direction D3. The yaw-rotation driver 134B2 is embedded in the base plate 134c1, and rotary drives the yaw rotational shaft 134B1 centering on the axial center. The yaw-rotation driver 134B2 uses electric power as a driving source, has a servomotor as an electric motor, and is controlled by the controller 300.

The pedestal member 134B3 is disposed on the third direction D3 side of the yaw rotational shaft 134B1. The pedestal member 134B3 includes a base plate 134B3a connected to the yaw rotational shaft 134B1 so as to rotate integrally, and two shaft supporting parts 134B3b extending in the third direction D3 from the base plate 134B3a. The pedestal member 134B3 is turnable in the yaw-direction with respect to the base plate 134c1.

The support member 134B6 has a similar configuration to the base plate 134c1 in the embodiment. The support member 134B6 is connected, on its upper surface in the third direction D3, to the lifting guides 134c4a and 134c4b, and the rod 134d3 (see FIG. 7) of the lifter 134d. The base plate 134c1 is separated from the lifting guides 134c4a and 134c4b and the rod 134d3.

The two pitch rotational shafts 134B4 rotatably couple the two shaft supporting parts 134B3b to the support member 134B6. Axial centers of the two pitch rotational shafts 134B4 are coaxial and perpendicular to the third direction D3. The support member 134B6 is turnable in the pitch-direction with respect to the pedestal member 134B3. The pitch-rotation driver 134B5 is disposed in the shaft supporting part 134B3b, and rotary drives the pitch rotational shafts 134B4 about their center axes. The pitch-rotation driver 134B5 uses electric power as a driving source, includes a servomotor as an electric motor, and is controlled by the controller 300.

The directing device 134B can arbitrarily change the directions (orientations) of the adhesion part 134a and the supporting body 134b in the yaw-direction and the pitch-direction with respect to the base 132, by the rotational driving forces of the yaw-rotation driver 134B2 and the pitch-rotation driver 134B5.

The robot hand 130B according to Modification 2 as described above can achieve effects similarly to the embodiment. Since the directing device 134B can change the oriented direction of the adhesion part 134a, it can certainly cause the suctioner 134aak to contact and suck the surface of the article A. Although the directing device 134B is configured to change the oriented direction in the rotational directions centering on the two axes, it is not limited to this configuration. The directing device 134B may be configured to change the direction in the rotational direction centering on one axis, or rotational directions centering on three or more axes. The configuration of the directing device 134B is not limited to the gimbal, as long as it can change the direction. The configuration of the robot hand 130B according to Modification 2 may be applied to Modification 1.

<Modification 3>

A robot hand 130C according to Modification 3 is described. The robot hand 130C according to Modification 3 is different from the embodiment and Modifications 1 and 2 in that the image capture 400 is disposed at a holder 134C. Below, Modification 3 is described focusing on the different point from the embodiment and Modifications 1 and 2, and description similar to the embodiment and Modifications 1 and 2 will suitably be omitted.

Figure 23:
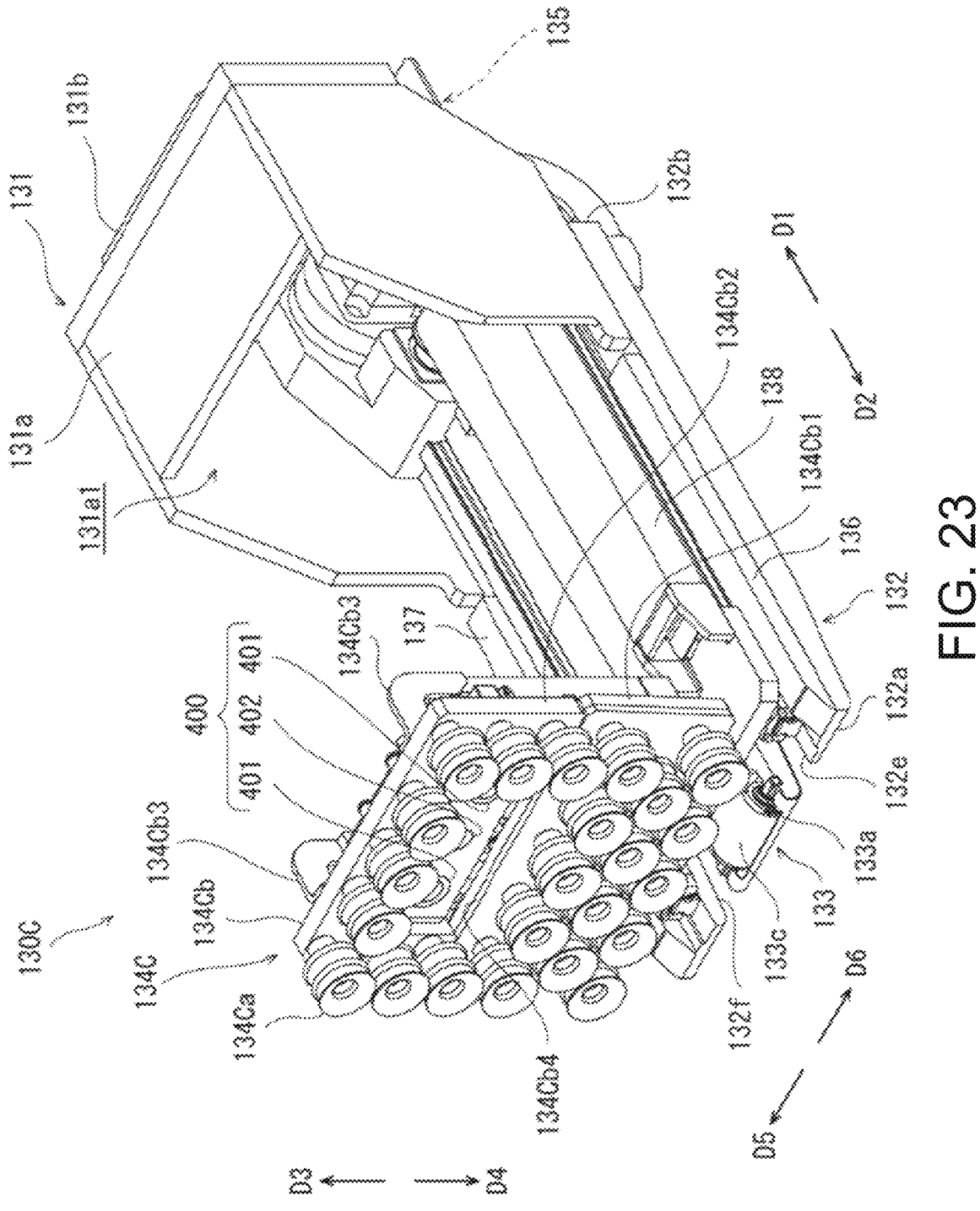
FIG. 23 is a perspective view illustrating one example of a configuration of a robot hand according to Modification 3, similarly to FIG. 3.
Figure 24:
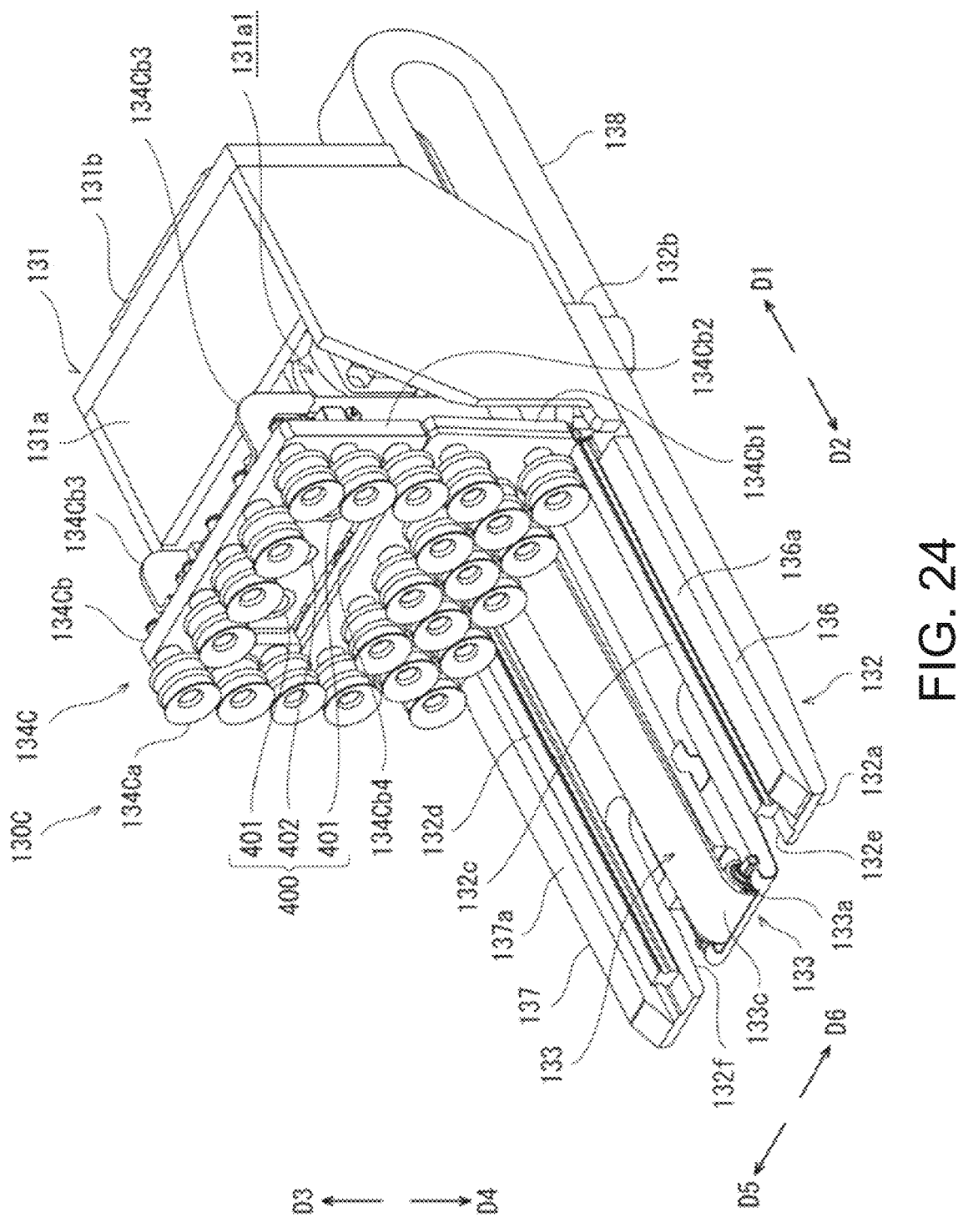
FIG. 24 is a perspective view illustrating one example of the configuration of the robot hand according to Modification 3, similarly to FIG. 5.

FIG. 23 is a perspective view illustrating one example of a configuration of the robot hand 130C according to Modification 3, similarly to FIG. 3. FIG. 24 is a perspective view illustrating one example of the configuration of the robot hand 130C according to Modification 3, similarly to FIG. 5. As illustrated in FIGS. 23 and 24, the robot hand 130C is provided with the holder 134C, and the holder 134C is fixed to the driving belt 133c similarly to the holder 134 of the embodiment.

The image capture 400 is disposed at a supporting body 134Cb of the holder 134C, and movable in the directions D1 and D2 together with the supporting body 134Cb. The supporting body 134Cb includes a first part 134Cb1 in a rectangular flat plate shape, a second part 134Cb2 in an inverse-U flame shape, and two third parts 134Cb3. The second part 134Cb2 is located on the third direction D3 side of the first part 134Cb1. The third parts 134Cb3 are located on the first direction D1 side of the first part 134Cb1 and the second part 134Cb2, and couple the first part 134Cb1 to the second part 134Cb2. The image capture 400 is disposed in an opening 134Cb4 formed between the first part 134Cb1 and the second part 134Cb2, and supported by the third parts 134Cb3. The image capture 400 is directed to the second direction D2. A field of view of the image capture 400 is not interrupted by the holder 134C regardless of the position of the holder 134C in the directions D1 and D2.

Figure 25:
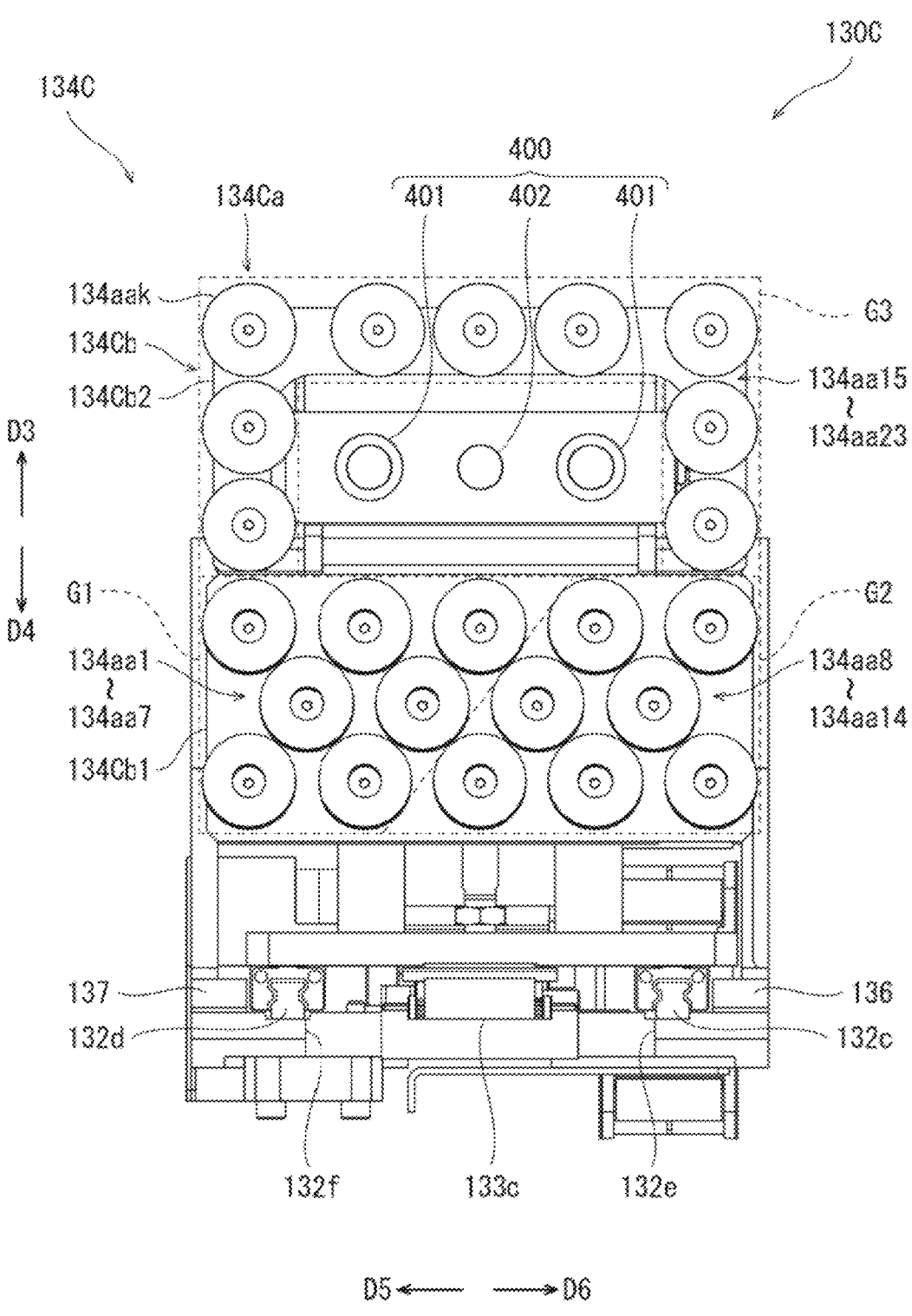
FIG. 25 is a front view illustrating a holder illustrated in FIG. 23 when seen in the first direction, similarly to FIG. 8.

FIG. 25 is a front view illustrating the holder 134C of FIG. 23 when seen in the first direction D1, similarly to FIG. 8. As illustrated in FIG. 25, the holder 134C has an adhesion part 134Ca on the supporting body 134Cb, similarly to the holder 134 of the embodiment. The adhesion part 134Ca includes the suctioners 134aak directed in the second direction D2, and includes, for example, twenty-three suctioners 134aa1-134aa23. The suctioners 134aa1-134aa14 are disposed at the first part 134Cb1, and arrayed to form three rows extending in the fifth direction D5. The suctioners 134aa15-134aa23 are disposed at the second part 134Cb2, and lined-up in a row in an inverse-U shape along the second part 134Cb2. The suctioners 134aa1-134aa23 are disposed around the image capture 400 in a direction intersecting with (in detail, orthogonal to) the second direction D2 which is the direction of the image capture 400, so as not to interrupt the field of view of the image capture 400.

On the first part 134Cb1, the suctioners 134aa1-134aa7 disposed on the fifth direction D5 side with respect to the center in the directions D5 and D6, constitute the first suctioner group G1 as surrounded by a broken line, and communicate with the first piping system 181. The suctioners 134aa8-134aa14 disposed on the sixth direction D6 side with respect to the center, constitute the second suctioner group G2 as surrounded by a broken line, and communicate with the second piping system 182. The suctioners 134aa15-134aa23 constitute the third suctioner group G3, and communicate with the third piping system 183. The controller 300 may select from the suctioner groups G1-G3 to generate negative pressure, corresponding to the shape, size, etc., of the article A to be transferred.

Figure 26:
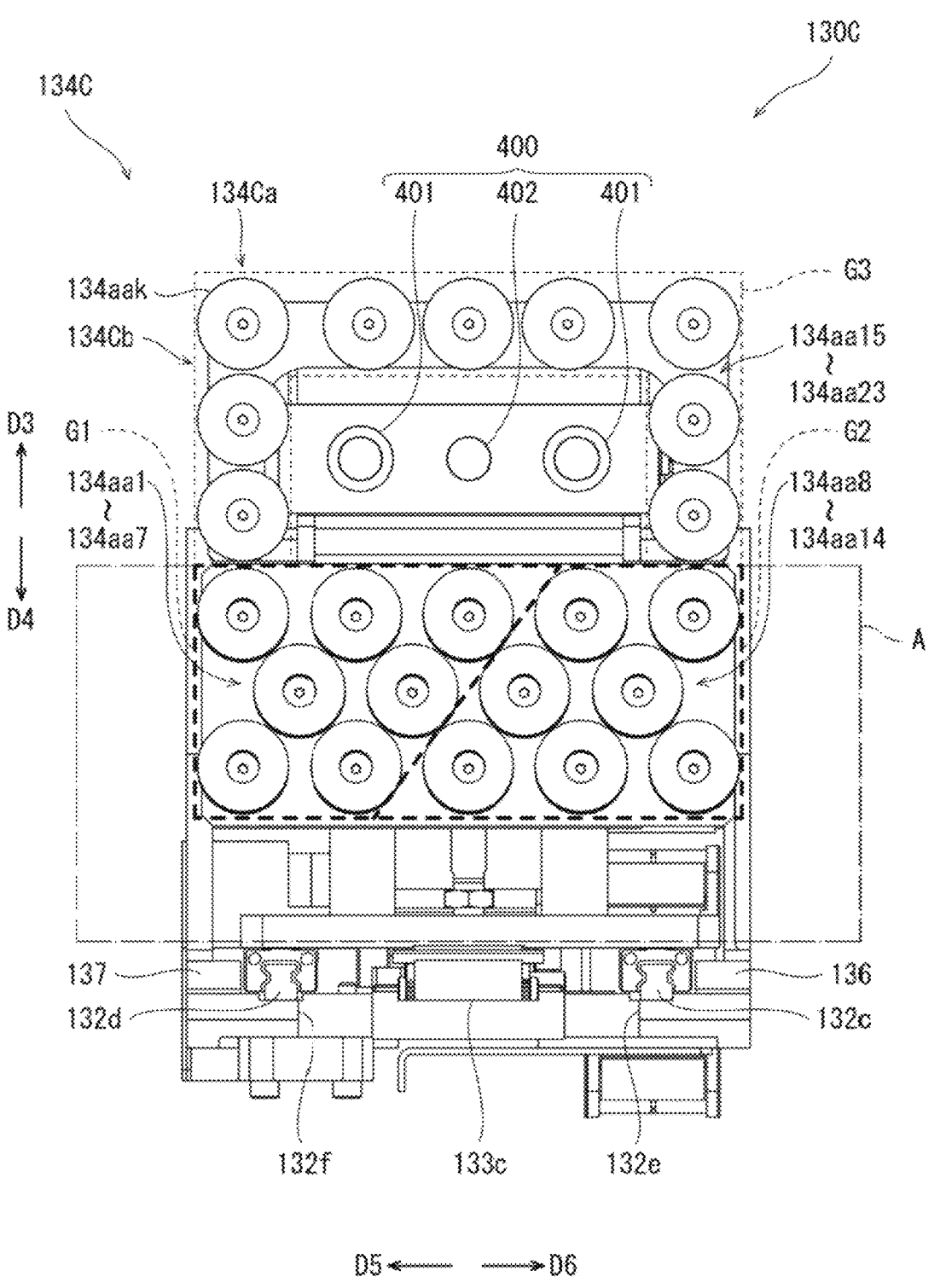
FIG. 26 is a front view illustrating one example of a loaded state of an article on the robot hand according to Modification 3.
Figure 27:
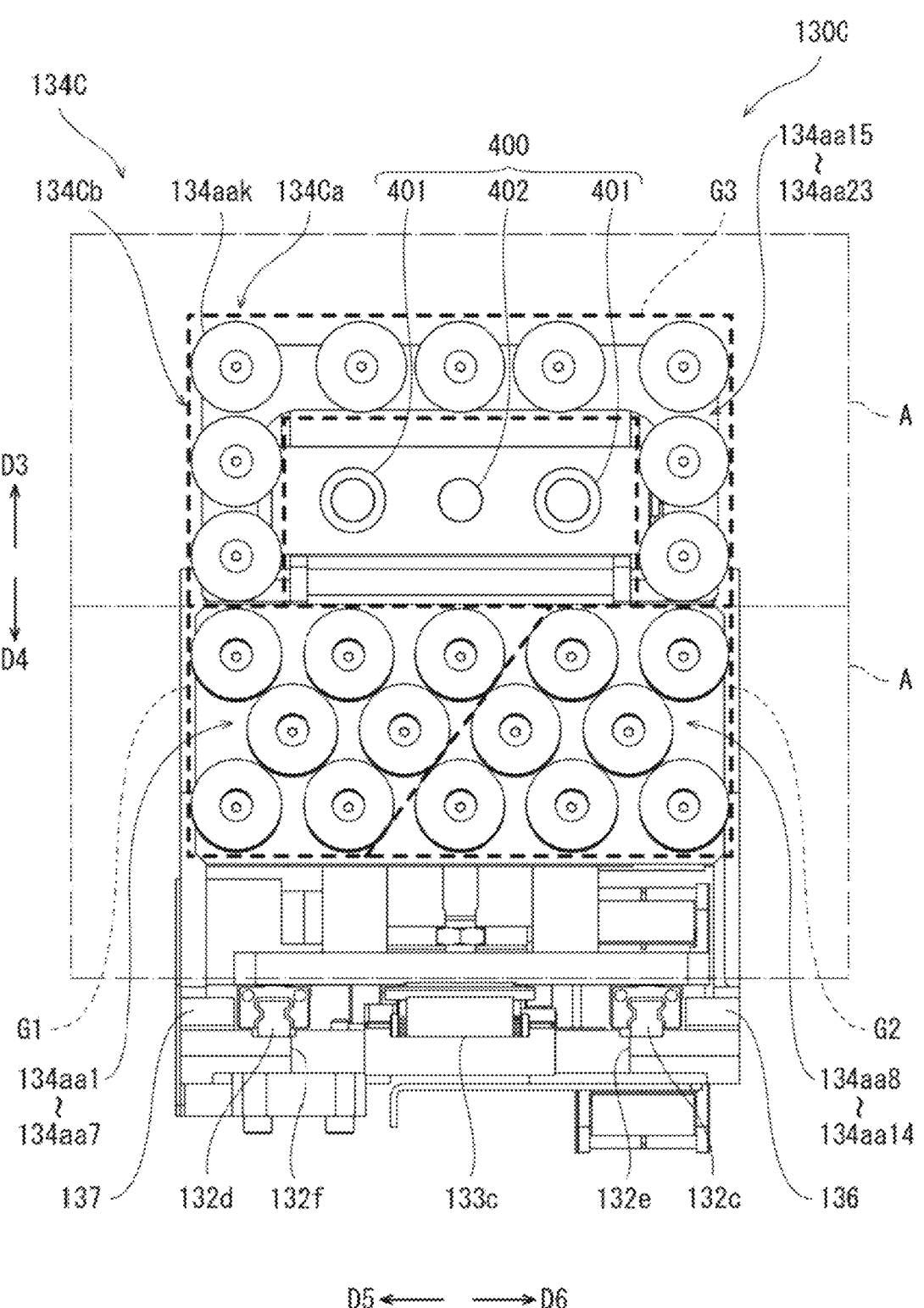
FIG. 27 is a front view illustrating one example of the loaded state of the article on the robot hand according to Modification 3.
Figure 28:
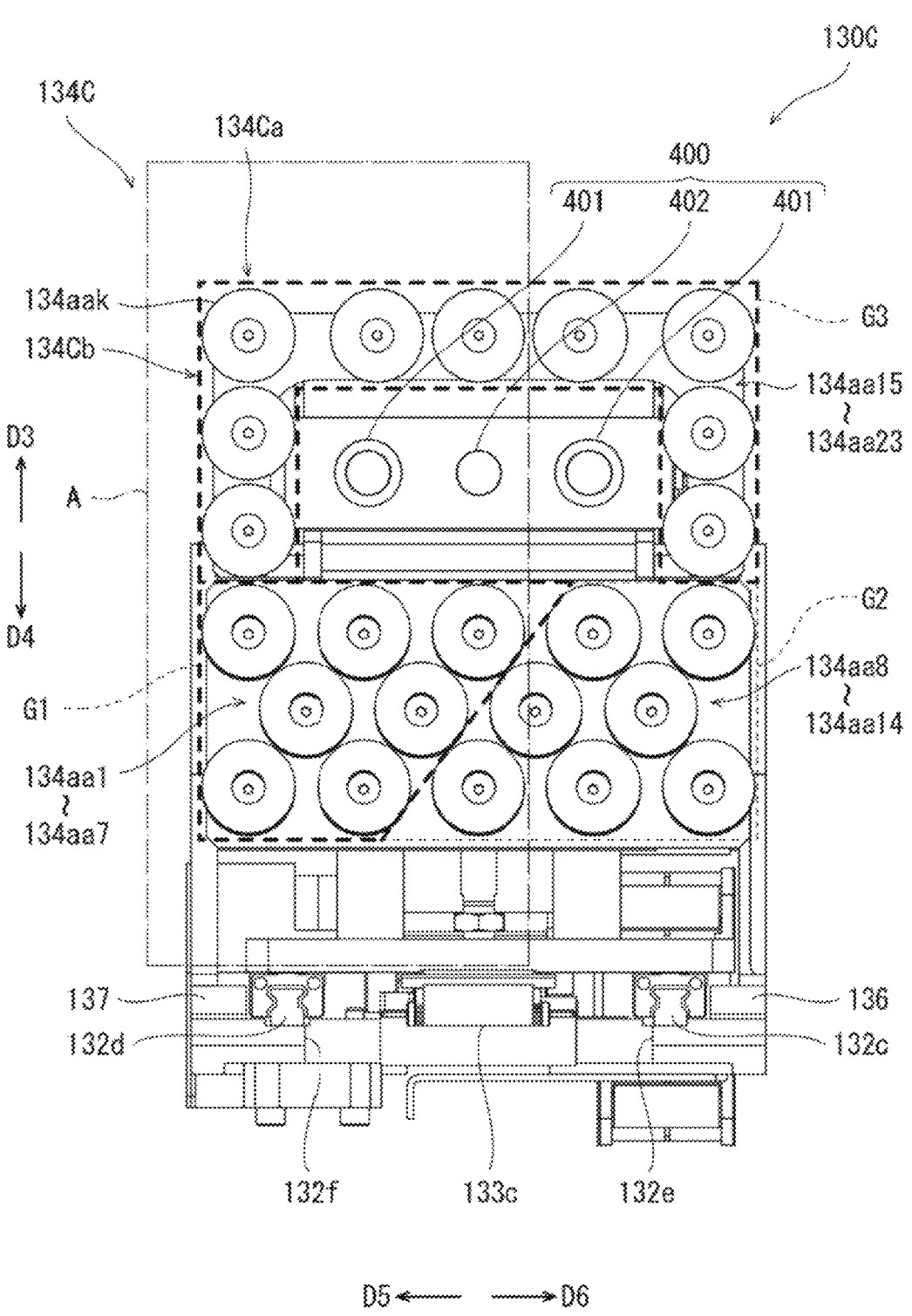
FIG. 28 is a front view illustrating one example of the loaded state of the article on the robot hand according to Modification 3.

The robot hand 130C as described above can load and transfer the article A with various shapes and sizes. FIGS. 26 to 28 are front views each illustrating one example of a loaded state of the article A on the robot hand 130C according to Modification 3. As illustrated in FIG. 26, when the target article A has a width larger than the supporting body 134Cb in the horizontal directions D5 and D6, and a height smaller than the supporting body 134Cb in the vertical directions D3 and D4, the controller 300 operates the robot hand 130C to suck and load the article A while generating negative pressure at a set of the first suctioner group G1 and the second suctioner group G2.

When the target article A has the width and height larger than the supporting body 134Cb in the horizontal direction and the vertical direction, the controller 300 operates the robot hand 130C to suck and load the article A while generating negative pressure at all of the first suctioner group G1 to the third suctioner group G3. For example, as illustrated in FIG. 27, also when the target article is the vertically piled-up two articles A each of which is the article A illustrated in FIG. 26, the controller 300 causes the robot hand 130C to suck and load the two articles A while generating negative pressure at all of the first suctioner group G1 to the third suctioner group G3.

As illustrated in FIG. 28, when the target article A has a width smaller than the supporting body 134Cb in the horizontal direction, and a height larger than the supporting body 134Cb in the vertical direction, the controller 300 operates the robot hand 130C to suck and load the article A while generating negative pressure at a set of the first suctioner group G1 and the third suctioner group G3, or a set of the second suctioner group G2 and the third suctioner group G3.

For example, the controller 300 may determine the set to generate negative pressure according to the size of a space adjacent to the article A to be transferred, in the directions D5 and D6. In this modification the suctioners 134aa1-134aa23 are each provided with a check valve so that the negative pressure is prevented from leaking from the suctioner.

In addition, as illustrated in FIGS. 24 and 25, the end 132a of the base 132 of the robot hand 130C is formed with notched parts 132e and 132f. The notched parts 132e and 132f notch a part of the base 132 so as to penetrate the base 132 in the directions D3 and D4, and extend in the first direction D1 from the end 132a. Each of the notched parts 132e and 132f has an elongated slit shape extending in the first direction D1 from the end 132a. The notched parts 132e and 132f are separate from each other in the directions D5 and D6. The notched part 132e is formed between the driving belt 133c and the base guide 132c, and the notched part 132f is formed between the driving belt 133c and the base guide 132d. Such a base 132 has a pectinate shape near the end 132a. The notched parts 132e and 132f are used when unloading the article A loaded on the robot hand 130C.

Figure 29:
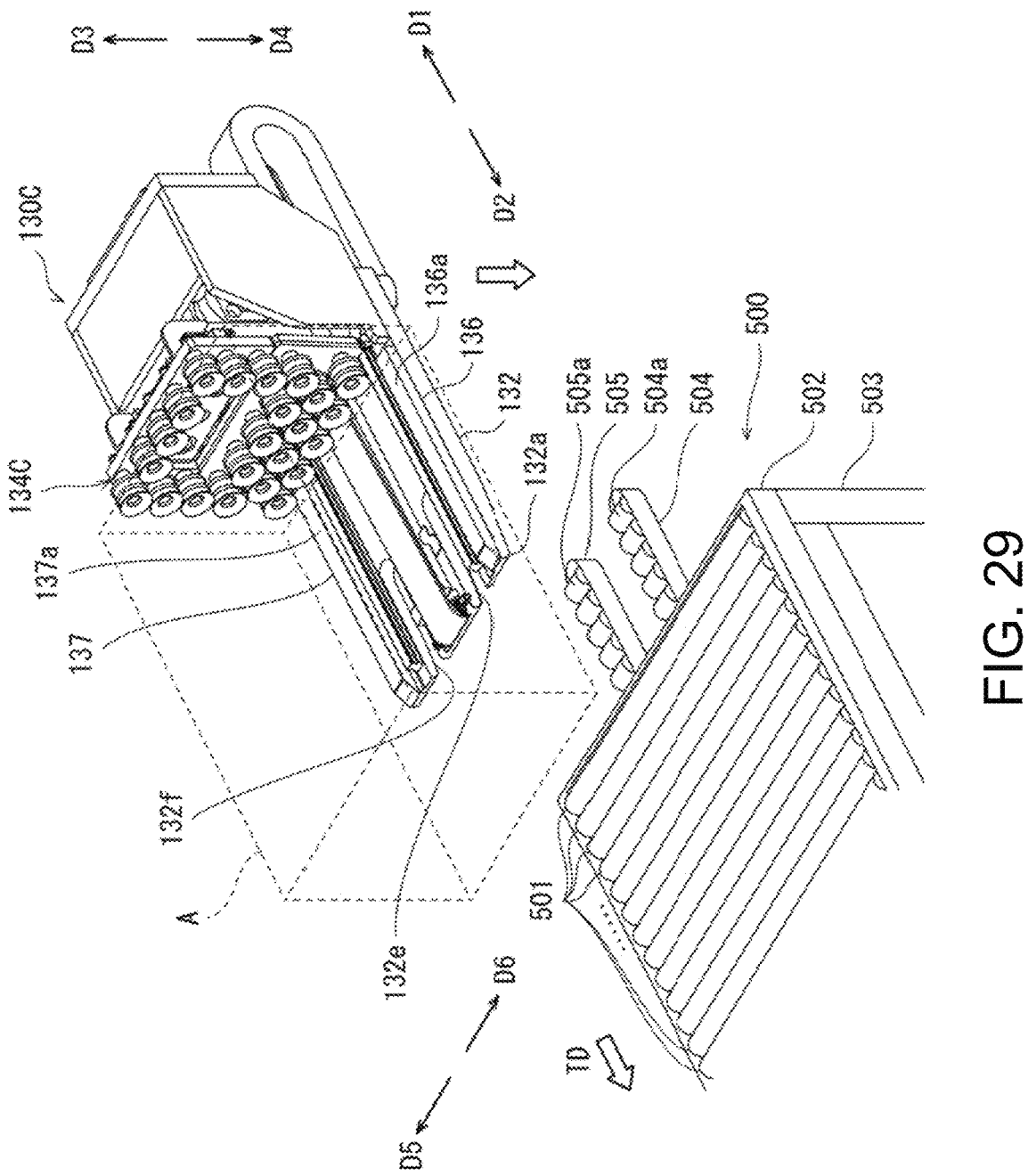
FIG. 29 is a perspective view illustrating one example of operation of the robot hand according to Modification 3 for unloading the loaded article.
Figure 30:
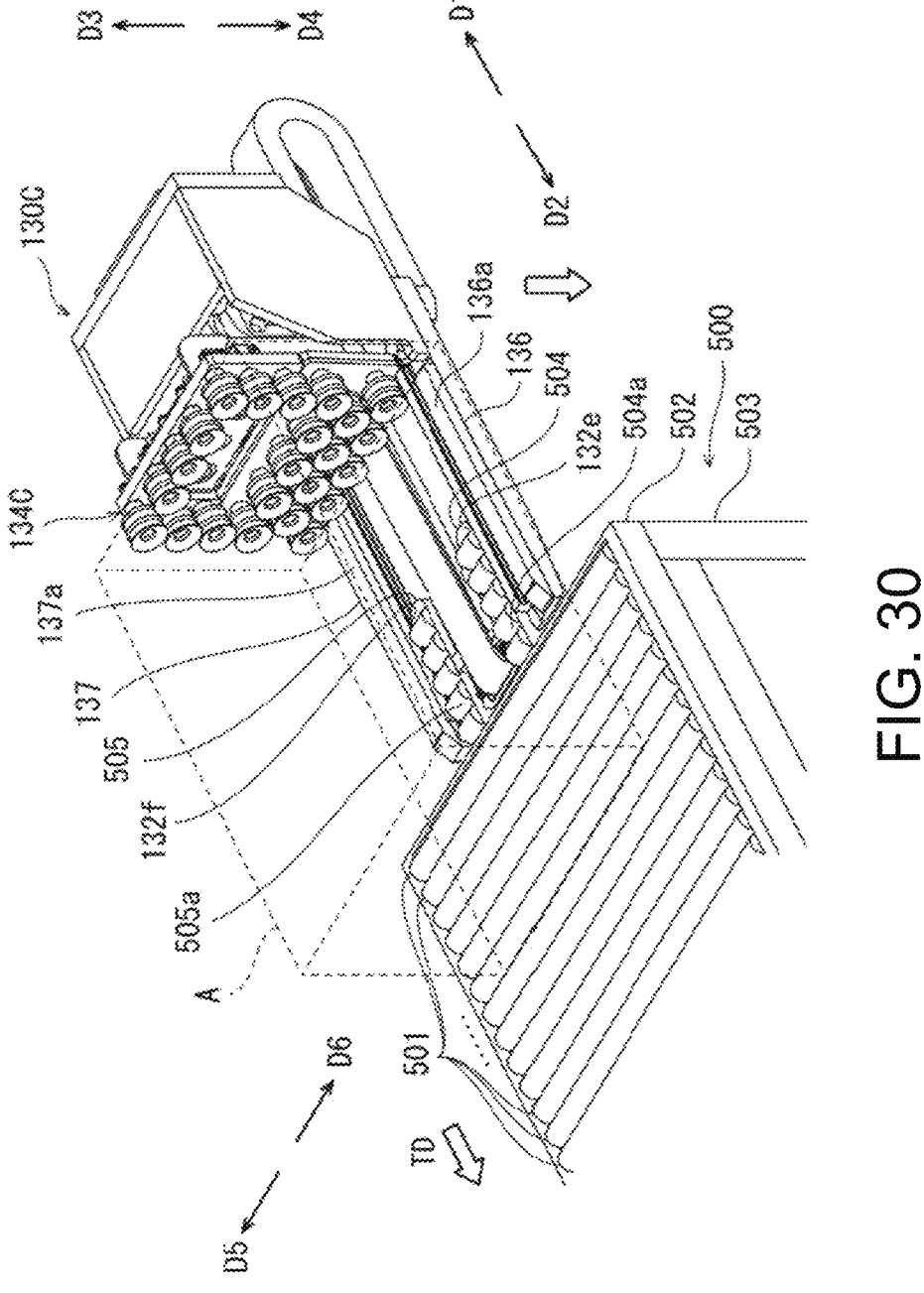
FIG. 30 is a perspective view illustrating one example of the operation of the robot hand according to Modification 3 for unloading the loaded article.

FIGS. 29 and 30 are perspective views each illustrating one example of operation of the robot hand 130C according to Modification 3 for unloading the loaded article A. As illustrated in FIG. 29, a reception device 500 is disposed in the robot system 1, and the reception device 500 receives the loaded article A from the robot hand 130C. Although in this modification the reception device 500 is included in the robot system 1 as a component, it is not limited to this configuration.

A configuration of the reception device 500 is not limited in particular, as long as the reception device 500 can receive the loaded article A from the robot hand 130C. In this modification, the reception device 500 is a transferring device which can transfer the article A, and is, for example, a conveyor. The reception device 500 is a so-called roller conveyor, and includes rollers 501 aligned in a transferring direction TD, a frame body 502 which rotatably supports the respective rollers 501, and a supporting table 503 which supports the frame body 502 on a supporting surface such as a floor surface. A rotational axis of each roller 501 extends in the horizontal direction perpendicular to the transferring direction TD. The rollers 501 are disposed at heights different from each other so as to form a sloped surface which is gradually lowered in the transferring direction TD. When the article A is placed on the rollers 501, the article A rotates the rollers 501 by the action of gravity, and moves in the transferring direction TD. The rollers 501 significantly lower a sliding resistance of the article A.

The reception device 500 includes projections 504 and 505 at an upstream end of the frame body 502 in the transferring direction TD. Each of the projections 504 and 505 has a pillar shape extending from the frame body 502 in the direction opposite from the transferring direction TD, and is fixed to and supported by the frame body 502 or the supporting table 503. Each of the projections 504 and 505 has, on its upper part, rollers 504a or 505a which are aligned in the transferring direction TD so as to be rotatable. A direction of rotational axes of the rollers 504a and 505a is the same as the direction of the rotational axes of the rollers 501. The rollers 504a and 505a are disposed at heights different from each other so as to form a sloped surface which is inclined in a similar direction and by a similar amount to the sloped surface formed by the rollers 501. Although the sloped surfaces formed by the rollers 504a and 505a, respectively, and the sloped surface formed by the rollers 501 form a continuous sloped surface, they may have a step therebetween, or may have different inclination directions and/or inclination amounts. The rollers 504a and 505a are not essential, but, for example, the projections 504 and 505 may have flat upper surfaces.

The projections 504 and 505 have the shapes and sizes which can pass through the notched parts 132e and 132f of the base 132 of the robot hand 130C, respectively, in the directions D5 and D6, and may have, for example, the shapes and sizes approximate to the notched parts 132e and 132f. The projections 504 and 505 are arranged having an interval therebetween similar to the interval between the notched parts 132e and 132f in the directions D5 and D6. Although in this modification the lengths of the projections 504 and 505 in the transferring direction TD are longer than the lengths of the notched parts 132e and 132f in the first direction D1, it is not limited to this length.

When the article A loaded on the base 132 of the robot hand 130C is unloaded to the reception device 500, the controller 300 executes the following control. As illustrated in FIG. 29, the controller 300 positions the robot hand 130C so that the notched parts 132e and 132f are located above the projections 504 and 505, respectively, and the recessed direction of the notched parts 132e and 132f is in agreement with the projecting direction of the projections 504 and 505. At this time, the controller 300 may adjust the posture of the robot hand 130C so that the upper surfaces 136a and 137a of the sliding members 136 and 137 of the robot hand 130C incline in a similar direction and by a similar amount to the rollers 504a and 505a.

Next, as illustrated in FIG. 30, the controller 300 lowers the robot hand 130C vertically downwardly. The projections 504 and 505 are inserted, from below, into the notched parts 132e and 132f, and then protruded from the upper side of the notched parts 132e and 132f, respectively, so as to contact the bottom surface of the article A and support the article A from below. After the controller 300 lowers the robot hand 130C to a given height at which the bottom surface of the article A is separated from the sliding members 136 and 137, the controller 300 moves the robot hand 130C in the first direction D1 to retreat from the reception device 500, and removes the article A from the robot hand 130C.

The bottom surface of the article A is supported by the rollers 504a and 505a, and the rollers 501. The article A slides in the transferring direction TD by the action of component force of the gravity in the transferring direction TD.

The robot hand 130C as described above can unload the article A to the reception device 500 without sliding the holder 134C in the second direction D2, and thus, time required for unloading the article A can be shortened. A timing at which the suctioners 134aak cancel the suction of the article A may be any timing before the robot hand 130C is lowered to the given height.

The robot hand 130C according to Modification 3 as described above can achieve effects similarly to the embodiment. Moreover, since the image capture 400 is disposed at the holder 134C so as to move together with the holder 134C, it is avoided that the field of view of the image capture 400 is interrupted by the holder 134C regardless of the position of the holder 134C. Further, since the suctioners 134aa1-134aa23 are disposed around the image capture 400 in a direction intersecting with the imaging direction of the image capture 400, the interruption of the field of view of the image capture 400 can be avoided. Therefore, the image capture 400 can surely image the article A.

The robot hand 130C according to Modification 3 may be lowered toward the reception device 500 by the robotic arm 120 so that the projections 504 and 505 are inserted into the notched parts 132e and 132f from below and support the article A placed on the base 132. According to this, when the robot hand 130C unloads the article A to the reception device 500, the holder 134C is not required to be moved in the second direction D2 to push out the article A. Therefore, the operation of the robot hand 130C can be simplified and speeded-up. In addition, since the projections 504 and 505 extend in the first direction D1 toward the inside of the base 132, the article A on the base 132 can stably be supported by the wide range.

Although the robot hand 130C according to Modification 3 is provided with the two notched parts 132e and 132f, and the reception device 500 is provided with the two projections 504 and 505, the numbers of the notched parts and the projections may each be one, or three or more. Moreover, the numbers of the notched parts and the projections may be different from each other. For example, the controller 300 may select the notched part(s) through which the projection(s) passes, and the projection(s) which passes through the notched part(s), according to the loaded state of the article A on the base 132.

Although in Modification 3 the rollers 501, 504a, and 505a are configured to freely rotate without being applied with driving force, they may be applied with driving force by a driver(s). According to this, the reception device 500 can easily and certainly transfer the article A. The reception device 500 as the conveyor may be a belt conveyor.

The configuration of the robot hand 130C according to Modification 3 may be applied to Modifications 1 and 2.

OTHER EMBODIMENTS

Although the embodiment of the present disclosure is described above, the present disclosure is not limited to the above embodiment and modifications. That is, various changes and improvements are possible within a scope of the present disclosure. For example, modes in which various changes are applied to the embodiment and modifications, and modes in which components of different embodiment and modifications are combined are also included in the scope of the present disclosure.

For example, although in the embodiment and modifications the robot 100 includes a single robotic arm 120 and a single robot hand 130, 130A-130C, without being limited to this, the robot 100 may be provided with two or more robotic arms 120, and two or more robot hands 130, 130A-130C. The robot 100 may be configured to cause the two or more robotic arms 120 and the two or more robot hands 130, 130A-130C to operate cooperatively so as to convey the article A.

Although in the embodiment and modifications the holder 134 or 134C is provided with the adhesion part 134a or 134Ca which holds the article A while attaching the article A thereto, the configuration of the holder to hold the article A is not limited to this. The holder may have any configuration, as long as the holder can hold the article A and move it to above the transferring surface 133c1. For example, the holder may hold the article A by gripping, sandwiching, engaging, scooping, hanging, or magnetic force.

Although in the embodiment and modifications the adhesion part 134a and 134Ca include the suctioners 134aak, it is not limited to this configuration. For example, the adhesion part 134a or 134Ca may be configured to attach the article A thereto by adhesive force. Alternatively, the adhesion part 134*a* or 134Ca may be provided with a suction cup made of rubber, resin, etc., having flexibility, and may suck the article A by pushing the suction cup thereto. Further, in order to increase the suction force, a mechanism to suck air out of a suction surface of the suction cup may be provided.

Although in the embodiment and modifications the suctioners 134*aak* of the holder 134 or 134C are divided into three suctioner groups G1-G3, it is not limited to this configuration. The suctioners 134*aak* may constitute a sole suctioner group, or may be divided into two suctioner groups, or four or more suctioner groups. Moreover, the respective suctioner groups may be connected to the negative pressure generator 180 via the piping systems different from each other.

Although in the embodiment and modifications the controller 300 uses the image captured by the image capture 400 to detect the 3D position and posture, etc., of the article A, it is not limited to this configuration. For example, a sensor which detects a distance to a target object may be provided to the robot hand 130 etc. The controller 300 may use the distance measured by the sensor to detect the position etc., of the article A. The sensor is, for example, a photoelectronic sensor, a laser sensor, and an ultrasonic sensor.

The technology of the present disclosure may be a transfer method. For example, the transfer method according to one aspect of the present disclosure is the transfer method of transferring an article by using the robot according to one aspect of the present disclosure. The method includes bringing, by the robotic arm, the holder of the robot hand to near the article, and holding the article by the holder, and driving the driving belt to move the transferring surface in the first direction while moving, by the robot hand, the holder holding the article in the first direction, and moving the article onto the transferring surface. According to this method, similar effect to the robot hand according to the present disclosure can be obtained.

A transfer method according to one aspect of the present disclosure is the transfer method of transferring an article placed on a placing surface by using the robot according to one aspect of the present disclosure. The robot hand further includes the fourth driver to move the holder in a direction intersecting with the transferring surface and in a direction toward and away from the transferring surface. The method includes bringing, by the robotic arm, the robot hand to take a first posture in which the transferring surface inclines to be away from the placing surface with distance from the article. The method includes bringing, by the robotic arm, the holder of the robot hand taking the first posture to near the article, and holding the article by the holder. The method includes moving, by the robot hand, the holder holding the article in a direction away from the transferring surface, and driving the driving belt to move the transferring surface in the first direction while moving, by the robot hand, in the first direction the holder moved in the direction away from the transferring surface, and moving the article onto the transferring surface. According to this method, similar effect to the robot hand according to the present disclosure can be obtained. Additionally, the article which does not allow the transferring surface to be located below the article, can be transferred.

A transfer method according to one aspect of the present disclosure is the transfer method of transferring an article by using the robot system according to one aspect of the present disclosure. The method includes bringing, by the robotic arm, the holder of the robot hand to near the article, and holding the article by the holder, and driving the driving belt to move the transferring surface in the first direction while moving, by the robot hand, the holder holding the article in the first direction, and moving the article onto the transferring surface. The method includes moving, by the robotic arm, the robot hand so that the at least one notched part of the base is located above the at least one projection of the reception device. The method includes lowering, by the robotic arm, the robot hand so that the at least one projection is inserted into the at least one notched part from below, and moving, by the robotic arm, the robot hand to retreat from the reception device while the article is placed on the at least one projection. According to this method, similar effect to the robot hand according to the present disclosure can be obtained. Additionally, the operation of the robot hand can be simplified and speeded-up.

The transfer methods as described above may be implemented by the controller 300 according to this embodiment. In detail, each transfer method may be implemented by a CPU, a circuit (e.g., an LSI), an IC card, or a single module, for example.

What is claimed is:

1. A robot, comprising:
   a robot hand to transfer an article, the robot hand including:
      a holder to move the article in a first direction while holding the article;
      a driving belt having a transferring surface on which the article is placed and driven to move the transferring surface in the first direction; and
      a first driver to drive the driving belt, wherein the holder moves in the first direction to place the held article onto the transferring surface;
   a robotic arm connected at an end thereof to the robot hand;
   a controller to control operation of the first driver and a second driver to drive the robotic arm;
   a negative pressure generator controlled by the controller; and
   an imaging device, wherein
   the holder includes an array of suctioners connected to the negative pressure generator and which sucks the article by negative pressure generated by the negative pressure generator, and
   a first suctioner of the array of suctioners is connected to the negative pressure generator through a first system,
   a second suctioner of the array of suctioners is connected to the negative pressure generator through a second system,
   the controller estimates a size of the article based on an image captured by the imaging device and showing the article, and
   the controller selects, based on the estimated size of the article, the first system or the second system to generate the negative pressure by the negative pressure generator.

2. The robot of claim 1, wherein the holder is fixed to the driving belt to be moved together with the transferring surface.

3. The robot of claim 1, further comprising a third driver to move the holder in the first direction.

4. The robot of claim 1, wherein the holder is directed to hold the article along a second direction opposite from the first direction.

5. The robot of claim 1, wherein the holder includes an adhesion part to hold the article by attaching the article thereto.

6. The robot of claim 5, wherein the adhesion part includes a suctioner to suck the article.

7. The robot of claim 6, wherein the adhesion part includes the array of suctioners.

8. The robot of claim 6, wherein the adhesion part includes the array of suctioners, the array of suctioners are arrayed in a direction intersecting with the transferring surface and in a direction toward and away from the transferring surface, and a suctioner of the array of suctioners distant from the transferring surface is disposed along the first direction compared to another suctioner of the array of suctioners near the transferring surface.

9. The robot of claim 1, further comprising a fourth driver to move the holder in a direction intersecting with the transferring surface and in a direction toward and away from the transferring surface.

10. The robot of claim 1, further comprising a fifth driver to change an oriented direction of the holder.

11. The robot of claim 1, wherein the first driver of the robot hand and the second driver of the robotic arm include servomotors, respectively, and the controller controls operation of the servomotor of the robot hand and operations of the servomotors of the robotic arm so as to cooperate with each other.

12. The robot of claim 11, wherein the controller includes at least one processor, and the at least one processor controls the operation of the servomotor of the robot hand and the operations of the servomotors of the robotic arm.

13. The robot of claim 1, wherein the controller controls a position and a posture of the robot hand with respect to the article, based on the image captured by the imaging device and showing the article.

14. The robot of claim 13, wherein the imaging device is disposed at the holder to be moved together with the holder.

15. A transfer method of transferring an article by using the robot of claim 1, comprising the steps of:

bringing, by the robotic arm, the holder of the robot hand near to the article and holding the article by the holder; and driving the driving belt to move the transferring surface in the first direction while moving, by the robot hand, the holder holding the article in the first direction, and moving the article onto the transferring surface.

16. A robot, comprising:

a robot hand to transfer an article, the robot hand including:

a holder to move the article in a first direction while holding the article; and a first driver to drive a transferring surface to move in the first direction, wherein the holder moves in the first direction to place the held article onto the transferring surface;

a robotic arm connected at an end thereof to the robot hand;

a controller to control operation of the first driver and a second driver to drive the robotic arm;

a negative pressure generator controlled by the controller; and an imaging device, wherein the holder includes an array of suctioners connected to the negative pressure generator and which sucks the article by negative pressure generated by the negative pressure generator, a first suctioner of the array of suctioners is connected to the negative pressure generator through a first system, a second suctioner of the array of suctioners is connected to the negative pressure generator through a second system, the controller estimates a size of the article based on an image captured by the imaging device and showing the article, and the controller selects, based on the estimated size of the article, the first system or the second system to generate the negative pressure by the negative pressure generator.

17. A robot, comprising:

a robot hand to transfer an article, the robot hand including:

a holder to move the article in a first direction while holding the article;

a driving belt having a transferring surface on which the article is placed and driven to move the transferring surface in the first direction; and a first driver to drive the driving belt, wherein the holder moves in the first direction to place the held article onto the transferring surface;

a robotic arm connected at an end thereof to the robot hand;

a controller to control operation of the first driver of the robot hand, and operation of a second driver to drive the robotic arm; and an imaging device disposed at the holder to be moved together with the holder, wherein the controller controls a position and a posture of the robot hand with respect to the article, based on an image captured by the imaging device and showing the article, the holder includes an array of suctioners to suck the article, and the suctioners are disposed around the imaging device in a direction intersecting with an imaging direction of the imaging device.

18. A robot system, comprising:

a robot including:

a robot hand to transfer an article, the robot hand including:

a holder to move the article in a first direction while holding the article;

a driving belt having a transferring surface on which the article is placed and driven to move the transferring surface in the first direction; and a first driver to drive the driving belt, wherein the holder moves in the first direction to place the held article onto the transferring surface;

a robotic arm connected at an end thereof to the robot hand; and a controller to control operation of the first driver of the robot hand, and operation of a second driver to drive the robotic arm; and a reception device to receive the article transferred by the robot, wherein the robot hand further includes a base on which the article is placed, the base is formed with at least one notched part at an end thereof in a direction opposite from the first direction, the reception device includes at least one projection to pass through the notched part in an up-and-down direction, and by the robotic arm lowering the robot hand toward the reception device, the robot hand inserts the at least one projection into the at least one notched part from below so that the at least one projection supports the article placed on the base.

19. A transfer method of transferring an article by using the robot system of claim 18, comprising the steps of:

bringing, by the robotic arm, the holder of the robot hand to near the article and holding the article by the holder;

driving the driving belt to move the transferring surface in the first direction while moving, by the robot hand, the holder holding the article in the first direction, and moving the article onto the transferring surface;

moving, by the robotic arm, the robot hand so that the at least one notched part of the base is located above the at least one projection of the reception device;

lowering, by the robotic arm, the robot hand so that the at least one projection is inserted into the at least one notched part from below; and moving, by the robotic arm, the robot hand to retreat from the reception device while the article is placed on the at least one projection.

20. A transfer method of transferring an article placed on a placing surface by using a robot including a robot hand to transfer an article, a robotic arm connected at an end thereof to the robot hand, and a controller, wherein the robot hand includes a holder to move the article in a first direction while holding the article; a driving belt having a transferring surface on which the article is placed and driven to move the transferring surface in the first direction; and a first driver to drive the driving belt, wherein the controller controls operation of the first driver of the robot hand and a second driver to drive the robotic arm, wherein the holder moves in the first direction to place the held article onto the transferring surface, and wherein the robot hand further includes another driver to move the holder in a direction intersecting with the transferring surface and in a direction toward and away from the transferring surface, the transfer method comprising the steps of:

bringing, by the robotic arm, the robot hand to take a first posture in which the transferring surface inclines to be away from the placing surface with distance from the article;

bringing, by the robotic arm, the holder of the robot hand taking the first posture to near the article and holding the article by the holder;

moving, by the robot hand, the holder holding the article in a direction away from the transferring surface; and driving the driving belt to move the transferring surface in the first direction while moving, by the robot hand, in the first direction the holder moved in the direction away from the transferring surface, and moving the article onto the transferring surface.

21. A transfer method of transferring an article placed on a placing surface by using a robot including a robot hand to transfer an article, a robotic arm connected at an end thereof to the robot hand, and a controller, wherein the robot hand includes a holder to move the article in a first direction while holding the article; and a first driver to drive a transferring surface to move in the first direction, wherein the holder moves in the first direction to place the held article onto the transferring surface, wherein the controller controls operation of the first driver of the robot hand and a second driver to drive the robotic arm, wherein the holder moves in the first direction to place the held article onto the transferring surface, and wherein the robot hand further includes another driver to move the holder in a direction intersecting with the transferring surface and in a direction toward and away from the transferring surface, the transfer method comprising the steps of:

bringing, by the robotic arm, the robot hand to take a first posture in which the transferring surface inclines to be away from the placing surface with distance from the article;

bringing, by the robotic arm, the holder of the robot hand taking the first posture to near the article and holding the article by the holder;

moving, by the robot hand, the holder holding the article in a direction away from the transferring surface; and driving the driving belt to move the transferring surface in the first direction while moving, by the robot hand, in the first direction the holder moved in the direction away from the transferring surface, and moving the article onto the transferring surface.

* * * * *